United States Patent
Kurosawa et al.

(10) Patent No.: US 9,178,462 B2
(45) Date of Patent: Nov. 3, 2015

(54) MOTOR DRIVE CONTROLLER AND METHOD FOR OPERATING THE SAME

(71) Applicant: Renesas Electronics Corporation, Kawasaki-shi, Kanagawa (JP)

(72) Inventors: Minoru Kurosawa, Kanagawa (JP); Kenji Yoshida, Kanagawa (JP); Osamu Yamashita, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 151 days.

(21) Appl. No.: 14/087,237

(22) Filed: Nov. 22, 2013

(65) Prior Publication Data
US 2014/0203751 A1    Jul. 24, 2014

(30) Foreign Application Priority Data

Jan. 23, 2013 (JP) ................................. 2013-010128

(51) Int. Cl.
*G05B 23/02* (2006.01)
*H02P 25/02* (2006.01)

(52) U.S. Cl.
CPC .................................... *H02P 25/028* (2013.01)

(58) Field of Classification Search
USPC ............... 318/565, 400.26, 400.29, 560, 632, 318/569, 798, 57; 360/78.04, 78.06, 77.02, 360/78.12; 361/18, 91.5
See application file for complete search history.

(56) References Cited

U.S. PATENT DOCUMENTS

| 6,903,894 | B2 | 6/2005 | Kokami et al. |
| 7,280,308 | B2 | 10/2007 | Kokami |
| 8,482,233 | B2* | 7/2013 | Kuroiwa ................. 318/400.26 |
| 2003/0227707 | A1* | 12/2003 | Kokami et al. ................. 360/75 |
| 2009/0021207 | A1* | 1/2009 | Kezobo et al. ................ 318/798 |
| 2011/0057735 | A1* | 3/2011 | Honda ............................ 331/57 |

FOREIGN PATENT DOCUMENTS

| JP | 64-39285 | A |  | 2/1989 |
| JP | 07058326 | A | * | 3/1995 |
| JP | 07-44399 | B2 |  | 5/1995 |
| JP | 2002-184137 | A |  | 6/2002 |
| JP | 2005-304095 | A |  | 10/2005 |
| JP | 2005-304096 | A |  | 10/2005 |
| JP | 2011-100499 | A |  | 5/2011 |

* cited by examiner

*Primary Examiner* — Shawki S Ismail
*Assistant Examiner* — Jorge L Carrasquillo
(74) *Attorney, Agent, or Firm* — Sughrue Mion, PLLC

(57) ABSTRACT

A motor driver controller including a difference control section; a driver output section; a drive current detection amplifier; and a load short-circuit detection circuit. A motor and sensing resistor is coupled in series and coupled to an output terminal of the driver output section. The difference control section generates a drive voltage command signal in response to a drive current command value and a drive current detection signal. The driver output section drives the motor and sensing resistor, in response to the drive voltage command signal, and a drive current detection amplifier generates a signal fed to the difference control section, in response to a drive current of the sensing resistor. The load short-circuit detection circuit detects an abnormal oscillation waveform signal caused by a short-circuit state between the both ends of the motor.

20 Claims, 8 Drawing Sheets

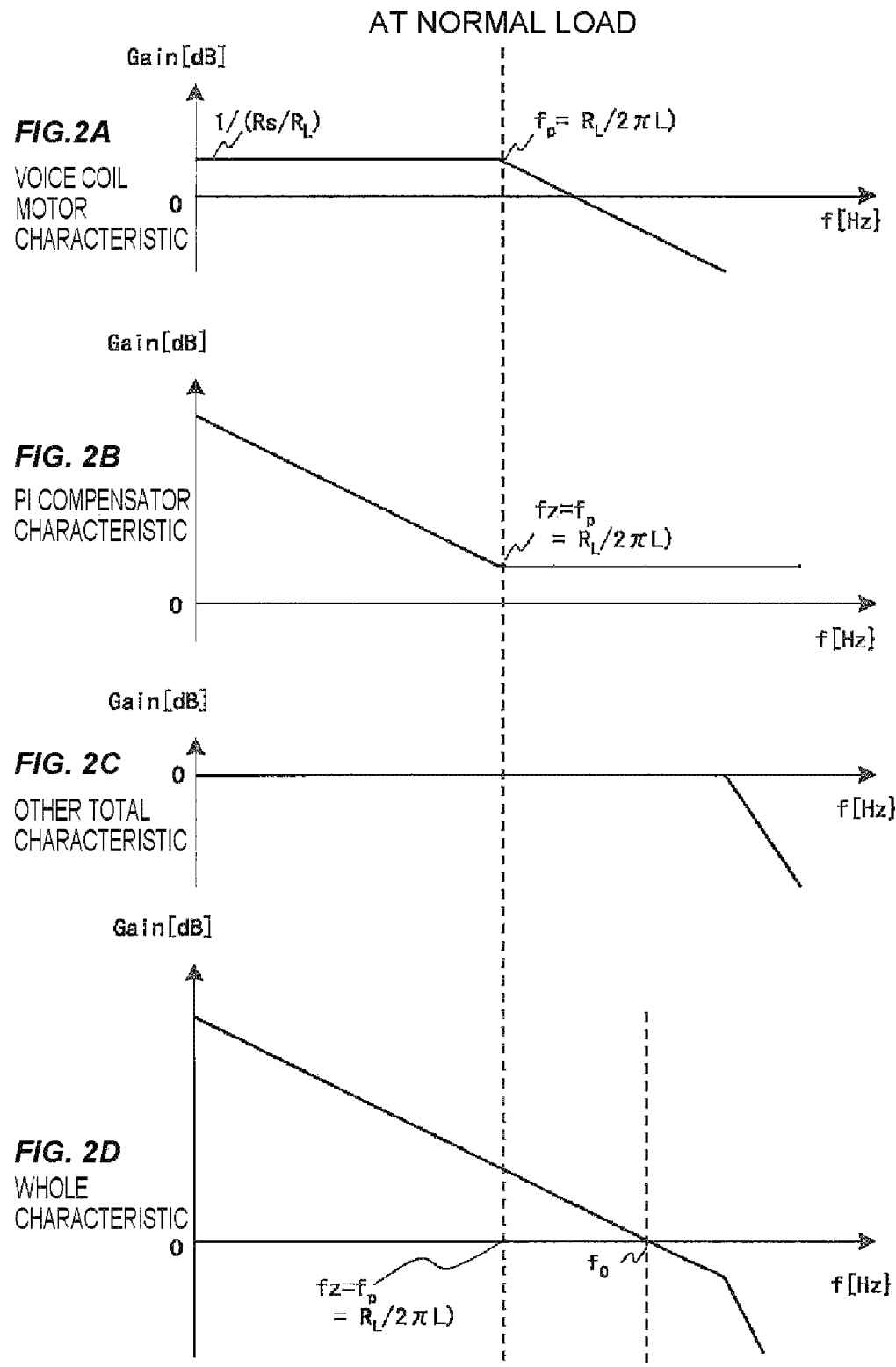

VOICE COIL MOTOR CHARACTERISTIC

PI COMPENSATOR CHARACTERISTIC

OTHER TOTAL CHARACTERISTIC

WHOLE CHARACTERISTIC

MOTOR DRIVE CONTROLLER AND METHOD FOR OPERATING THE SAME

CROSS-REFERENCE TO RELATED APPLICATION

The disclosure of Japanese Patent Application No. 2013-010128 filed on Jan. 23, 2013 including the specification, drawings and abstract is incorporated herein by reference in its entirety.

BACKGROUND

The present invention relates to a motor drive controller for driving a voice coil motor (VCM) or the like which moves a magnetic head of a hard disk drive unit and a method for operating the same, and in particular relates to a technique effective in enabling the detection of a short-circuit between both ends of the motor and an abnormal oscillation due to the short-circuit between the both ends.

In a hard disk drive unit (HDD), a load/unload system is adopted, in which, when not performing reading and writing of data, a magnetic head is retracted to a ramp mechanism outside an outer periphery of a magnetic disk and stopped there. The magnetic head is moved from a retract position of the ramp mechanism to a disk-medium surface by a loading operation in accordance with an instruction from a host, thereby performing a read/write operation, and after the end of the read/write operation, the magnetic head is contrarily moved from the disk-medium surface to the retract position of the ramp mechanism by an unloading operation in accordance with an instruction from the host.

Furthermore, in a hard disk drive unit (HDD), a magnetic disk is rotated at high speed by a spindle motor, and then the magnetic head for read/write is brought close to a medium surface of the rotating magnetic disk, and the magnetic head is moved to a radial direction of the magnetic disk by a voice coil motor (VCM), thereby writing/reading information of the magnetic disk.

Japanese Patent Laid-Open No. 2005-304095 (Patent Document 1) and Japanese Patent Laid-Open No. 2005-304096 (Patent Document 2) describe that in a voice coil motor drive circuit of a hard disk drive unit (HDD), a seek operation and a track follow operation of a magnetic head are performed by PWM driving, thereby resolving the problems, such as a design load and the scale of a circuit, in both a PWM drive system during seeking and a linear drive system during track follow. Note that, as well known, the seek operation is the operation for moving a magnetic head to a desired storage track, and the track follow operation is the operation for causing the magnetic head to follow a desired storage track for reading/writing. Furthermore, Patent Document 1 and Patent Document 2 describe that a control circuit for feedback-controlling the drive current of a coil of a voice coil motor of a hard disk drive unit (HDD) is constituted by a digital circuit.

Japanese Patent Laid-Open No. 2002-184137 (Patent Document 3) describes that during tracking, in order to achieve an increase in precision of a magnetic head positioning control and a reduction of the seek time, a linear drive mode for analogically-controlling the drive current of a voice coil motor is performed when an amount of drive for moving a magnetic head is small, whereas when the amount of drive for moving the magnetic head is large, a pulse drive mode (PWM) for digitally-controlling the drive current of the voice coil is performed. In the linear drive mode, a voice coil motor drive circuit outputs a drive current corresponding to a detection output of an error detection circuit that detects a difference between a control command value and a current detection voltage obtained by converting, into a voltage, the drive current of the voice coil motor. In contrast, in the pulse drive mode, the output current of the voice coil motor drive circuit is PWM-controlled by a PWM circuit that generates a pulse whose pulse width varies in accordance with the detection output of the error detection circuit. Selection between these two drive modes is achieved by a mode switching switch, a first input terminal and a second input terminal of which are coupled to a non-inverting input terminal and an output terminal of a PMW comparator of the PWM circuit, respectively. Because the mode switching switch selects the output terminal of the PMW comparator, which is the second input terminal, in response to a drive mode switching signal of a low level, the pulse drive mode (PWM) under PWM control with a varying pulse width is performed. The mode switching switch selects the non-inverting input terminal of the PMW comparator, which is the first input terminal, in response to the drive mode switching signal of a high level, and thus there is performed the linear drive mode in which a voice coil motor drive current is continuously feedback-controlled.

Japanese Patent Laid-Open No. 2011-100499 (Patent Document 4) describes that, in order to detect a ground short of an output line of a VCM driver for driving a voice coil motor (VCM), a gate-to-source voltage and a drain-to-source voltage of an N channel MOS transistor for controlling the current supply to the voice coil motor (VCM) are supplied to an abnormality monitoring circuit. When the ground short of the output line of the VCM driver is generated, the abnormality monitoring circuit determines that a short-circuit is generated because the gate-to-source voltage and drain-to-source voltage of the N channel MOS transistor exceed a certain voltage, respectively.

Publication of Examined Patent Application No. 07-44399 (Patent Document 5) describes that in a BTL push-pull amplifier used for an audio amplifier, in which an output terminal of one push-pull amplifier and an output terminal of other push-pull amplifier are coupled to one end and other end of a load, there is coupled a protection circuit that prevents destruction of an output transistor when one end and other end of the load are short-circuited (load short-circuited). Japanese Patent Laid-Open No. 07-44399 states that the protection circuit can reduce the maximum value of an emitter current of the output transistor when the load is short-circuited, and thus the BTL push-pull amplifier whose output transistor is unlikely to be destroyed can be realized.

Japanese Patent Laid-Open No. 64-39285 (Patent Document 6) describes that an overcurrent sensing circuit and a power supply shut-down/opening and closing circuit are coupled to a servo amplifier that drives a voice coil motor (VCM) of a magnetic disk unit, and when the overcurrent sensing circuit detects an overcurrent of the voice coil motor (VCM), the power supply shut-down/opening and closing circuit shuts down electric power supplied to the servo amplifier and stops the current supply to the voice coil motor (VCM).

SUMMARY

The present inventors engaged in the development of a semiconductor integrated circuit, so called a voice coil motor driver, for driving a voice coil motor (VCM) that moves a magnetic head in a hard disk drive unit (HDD), prior to the present invention. Specifically, this driver is a highly-integrated semiconductor integrated circuit, called a combo (COMBO) driver, having a spindle motor driver for driving a spindle motor that rotates a magnetic disk at a high speed and a voice coil motor driver for driving the voice coil motor integrated therein.

The present inventors, prior to the present invention, have found a problem that, by short-circuiting of both ends of a voice coil motor (VCM), a voice coil motor driver becomes an extremely light load state and a phase margin becomes insufficient in feedback-controlling the drive current of a coil of the voice coil motor, and thus an abnormal oscillation occurs. In a normal state where both ends of the voice coil motor (VCM) are not short-circuited, the phase margin in the feedback control is sufficient, and thus in a tracking operation or a seek operation, the feedback control is executed so that the difference between a control command value and a current detection voltage obtained by converting the drive current of the voice coil motor into a voltage becomes substantially zero.

Moreover, the short-circuit between both ends of the voice coil motor (VCM) occurs due to a damage on a flexible wiring, or due to adhesion of dirt or a conductive material, such as a metal, between the both ends of the flexible wiring. Once an abnormal oscillation occurs, a voice coil motor driver cannot drive a magnetic head for read/write in a hard disk drive unit (HDD). As a result, once an abnormal oscillation occurs, it becomes impossible to move a magnetic head from a retract position of a ramp mechanism to a disk-medium surface by a loading operation in accordance with an instruction from a host. Furthermore, not only the loading operation but also the tracking operation and seek operation become impossible.

In contrast, in order to detect the ground short of the output line of the VCM driver, the abnormality monitoring circuit described in Patent Document 4 monitors the gate-to-source voltage and drain-to-source voltage of an N channel MOS transistor, which controls the current supply to a voice coil motor (VCM), and thus cannot detect the short-circuit between the both ends of the voice coil motor (VCM). Accordingly, with the control method described in Patent Document 4, when both ends of the voice coil motor (VCM) are in a short-circuit state, it is impossible to prevent smoke generation or firing of the voice coil motor driver for driving the voice coil motor (VCM).

Furthermore, the protection circuit described in Patent Document 5 detects a short-circuit between one end and other end of the load of the BTL push-pull amplifier and prevents the destruction of an output transistor, but cannot detect an abnormal oscillation due to the short-circuit between the both ends of the voice coil motor (VCM). Accordingly, with the control method described in Patent Document 5, when both ends of the voice coil motor (VCM) are in a short-circuit state, it is impossible to prevent smoke generation or firing of the voice coil motor driver for driving the voice coil motor (VCM).

Moreover, the overcurrent sensing circuit and power supply shut-down/opening and closing circuit described in Patent Document 6 detect an overcurrent of a voice coil of the voice coil motor (VCM) and prevent the destruction of a transistor by shutting down the power supply, but cannot detect a short-circuit between the both ends of the voice coil motor (VCM) and cannot detect an abnormal oscillation due to the short-circuit. Accordingly, with the control method described in Patent Document 6, when both ends of the voice coil motor (VCM) are in a short-circuit state, it is impossible to prevent smoke generation or firing of the voice coil motor driver for driving the voice coil motor (VCM).

While the means for solving the above-described problems are described below, the other problems and the new feature will become clear from the description of the present specification and the accompanying drawings.

The following explains briefly the outline of a typical embodiment disclosed in the present application.

That is, a motor drive controller according to a typical embodiment includes a difference control section (100), a driver output section (102), a drive current detection amplifier (103), and a load short-circuit detection circuit (108).

A motor (VCM) and sensing resistor (Rs) coupled in series are coupled to an output terminal of the driver output section (102), the difference control section (100) generates a driver voltage command signal in response to a drive current command value and a drive current detection signal, to thereby supply the same to an input terminal of the driver output section (102), and the driver output section (102) drives the motor (VCM) and sensing resistor (Rs) coupled in series in response to the driver voltage command signal.

The drive current detection amplifier (103) generates a drive current detection signal fed back to the difference control section (100), in response to a drive current of the sensing resistor, an input terminal of the load short-circuit detection circuit (108) is coupled to one of circuit nodes in a feedback loop including the difference control section (100), the driver output section (102), the motor (VCM) and sensing resistor (Rs) coupled in series, and the drive current detection amplifier (103).

The load short-circuit detection circuit (108) detects an abnormal oscillation waveform signal generated in the one of circuit nodes due to a short-circuit state between both ends of the motor (VCM) (see FIG. 1).

The following explains briefly the effect obtained by the typical embodiment among the embodiments disclosed in the present application.

That is, with the motor drive controller, the detection of a short-circuit between both ends of a motor and the detection of an abnormal oscillation due to the short-circuit between the both ends are enabled.

BRIEF DESCRIPTION OF THE DRAWINGS

FIGS. 2A-2D are views showing the characteristics in a normal operation state where both ends of the voice coil motor (VCM) are in a non-short-circuit state when the semiconductor integrated circuit IC according to the first embodiment shown in FIG. 1 performs an operation for feedback-controlling the current value of a drive current Ivcm of a coil of the voice coil motor (VCM);

DETAILED DESCRIPTION

1. Overview of Embodiments

First, the overview of a typical embodiment disclosed in the present application will be described. In the overview description of the typical embodiment, a symbol referred to with parentheses in the accompanying drawings simply illustrates those included in the concept of a component with the symbol attached thereto.

[1] A motor drive controller according to a typical embodiment includes a difference control section (100), a driver output section (102), a drive current detection amplifier (103), and a load short-circuit detection circuit (108).

A motor (VCM) and sensing resistor (Rs) coupled in series can be coupled to an output terminal of the driver output section (102).

The difference control section (100) generates a driver voltage command signal (DDRV, ADRV) in response to a drive current command value (VCMCRNT) and a drive current detection signal (DIVCM), and supplies the same to an input terminal of the driver output section (102).

The driver output section (102) generates a drive output signal for driving the motor (VCM) and sensing resistor (Rs) coupled in series, in response to the driver voltage command signal (DDRV, ADRV) generated from the difference control section (100).

The drive current detection amplifier (103) generates the drive current detection signal (DIVCM) fed back to the difference control section (100), in response to a drive current (Ivcm) flowing through the sensing resistor (Rs).

An input terminal of the load short-circuit detection circuit (108) is coupled to the one of circuit nodes in a feedback loop including the difference control section (100), the driver output section (102), the motor (VCM) and sensing resistor (Rs) coupled in series, and the drive current detection amplifier (103).

Figure 1:
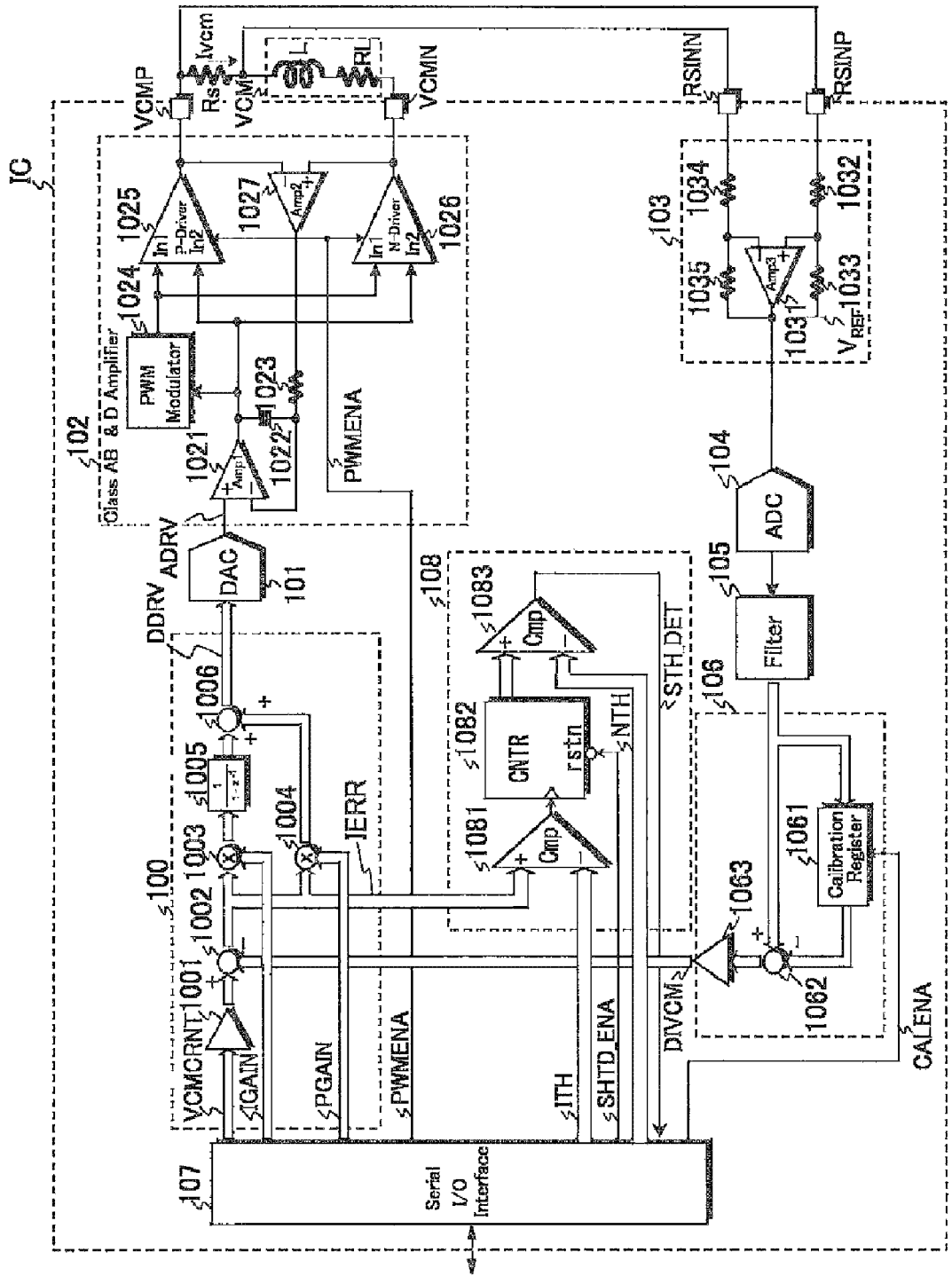
FIG. 1 is a view showing the configuration of a semiconductor integrated circuit IC according to a first embodiment, called a voice coil motor driver, for driving a voice coil motor (VCM) that moves a magnetic head of a hard disk drive unit (HDD)

The load short-circuit detection circuit (108) detects an abnormal oscillation waveform signal generated at the one of circuit nodes due to a short-circuit state between both ends of the motor (VCM) (see FIG. 1).

According to the embodiment, the detection of a short-circuit between both ends of a motor and the detection of an abnormal oscillation due to the short-circuit between the both ends are enabled.

In a preferred embodiment, the load short-circuit detection circuit (108) includes a first comparator (1081), to one input terminal of which the abnormal oscillation waveform signal generated at the one of circuit nodes is supplied and to other input terminal of which first threshold value information (ITH) is supplied.

In response to the abnormal oscillation waveform signal becoming a value larger than the first threshold value information (ITH), a first comparison output signal obtained by detecting the abnormal oscillation waveform signal is generated from an output terminal of the first comparator (1081) (see FIG. 1).

According to another preferred embodiment, the load short-circuit detection circuit (108) further includes a counter (1082), to a count input terminal of which the first comparison output signal generated from the output terminal of the first comparator (1081) is supplied.

The counter (1082) generates a count-up value by counting up in response to a pulse signal of the first comparison output signal, which is generated from the output terminal of the first comparator (1081) at a cycle of the abnormal oscillation waveform signal (see FIG. 1).

According to yet another preferred embodiment, the load short-circuit detection circuit (108) further includes a second comparator (1083), to one input terminal of which the count-up value generated by the counter (1082) is supplied and to other input terminal of which second threshold value information (NTH) is supplied.

In response to the count-up value becoming a value larger than the second threshold value information (NTH), a second comparison output signal, which is obtained by detecting the abnormal oscillation waveform signal from an output terminal of the second comparator (1083), is generated.

The load short-circuit detection circuit (108) outputs the second comparison output signal generated from the output terminal of the second comparator (1083), as a load short-circuit detection signal (STH_DET) (see FIG. 1).

A motor drive controller according to a further preferred embodiment further includes an external interface (107), a digital-to-analog converter (101), and an analog-to-digital converter (104).

The external interface (107) supplies the drive current command value (VCMCRNT), which is digital information supplied from the outside, to a command input terminal of the difference control section (100).

The digital-to-analog converter (101) generates an analog drive voltage command signal (ADRV) in response to the driver voltage command signal (DDRV) that is a digital signal supplied from the difference control section (100), and supplies the analog drive voltage command signal (ADRV) to the input terminal of the driver output section (102).

The drive current detection amplifier (103) generates a drive current analog amplification signal in response to the drive current (Ivcm) flowing through the sensing resistor (Rs).

The analog-to-digital converter (104) generates the drive current detection signal (DIVCM) which is a digital detection signal fed back to the feedback terminal of the difference control section (100), in response to the drive current analog amplification signal generated from the drive current detection amplifier (103) (see FIG. 1).

According to another further preferred embodiment, the driver output section (102) includes a pre-driver (1021), a first driver output amplifier (1025), and a second driver output amplifier (1026).

The analog drive voltage command signal (ADRV) generated from the digital-to-analog converter (101) is supplied to an input terminal of the pre-driver (1021).

An output terminal of the pre-driver (1021) is coupled to an input terminal of the first driver output amplifier (1025) and an input terminal of the second driver output amplifier (1026), and an output terminal of the first driver output amplifier (1025) and an output terminal of the second driver output amplifier (1026) can be coupled to one end and other end of the motor (VCM) and sensing resistor (Rs) coupled in series, respectively.

In a pulse drive operation mode, the first driver output amplifier (1025) and the second driver output amplifier (1026) generate a drive pulse having a pulse width proportional to a voltage level of the output terminal of the pre-driver (1021).

In a linear drive mode different from the pulse drive operation mode, the first driver output amplifier (1025) and the second driver output amplifier (1026) generate an amplified output signal proportional to a voltage level of the output terminal of the pre-driver (1021) (see FIG. 1).

According to yet a further preferred embodiment, in the pulse drive operation mode, a predetermined bias voltage is supplied to each transistor of the first driver output amplifier (1025) and the second driver output amplifier (1026) so that the first driver output amplifier (1025) and the second driver output amplifier (1026) execute a class-D amplification operation.

In the linear drive mode, a bias voltage larger than the predetermined bias voltage is supplied to the each transistor of the first driver output amplifier (1025) and the second driver output amplifier (1026) so that the first driver output amplifier (1025) and the second driver output amplifier (1026) execute a class-AB amplification operation (see FIG. 1).

According to another further preferred embodiment, the digital-to-analog converter (101) is a ΣΔ digital-to-analog converter (see FIG. 1).

According to yet another further preferred embodiment, the analog-to-digital converter (104) is an oversampling ΣΔ analog-to-digital converter (see FIG. 1).

The motor controller according to a specific embodiment further includes a decimation filter (105) coupled between an output terminal of the oversampling ΣΔ analog-to-digital converter (104) and the feedback terminal of the difference control section (100).

The decimation filter (105) executes decimation processing of a conversion output signal of the oversampling ΣΔ analog-to-digital converter and low pass filtering processing for suppressing quantization noises in a high frequency region of the oversampling ΣΔ analog-to-digital converter (see FIG. 1).

The motor controller according to another specific embodiment further includes an offset calibration section (106) coupled between an output terminal of the decimation filter (105) and the feedback terminal of the difference control section (100).

The offset calibration section (106) includes a calibration register (1061) and an offset digital subtractor (1062).

In a state where the drive current (Ivcm) of the sensing resistor (Rs) is set to substantially zero, error information about the drive current detection amplifier (103), the analog-to-digital converter (104), and the decimation filter (105) is stored into the calibration register (1061).

In the normal operation, the offset digital subtractor (1062) subtracts the error information stored in the calibration register (1061) from the output signal of the decimation filter (105), thereby generating the drive current detection signal (DIVCM) that is the digital detection signal fed back to the feedback terminal of the difference control section (100) (see FIG. 1).

According to a more specific embodiment, the motor is a voice coil motor (VCM) that moves a magnetic head of a hard disk drive unit (HDD) (see FIG. 1).

According to another more specific embodiment, the difference control section (100) includes a digital subtractor (1002) that performs digital subtraction between the drive current command value (VCMCRNT) supplied to the command input terminal of the difference control section (100) and the drive current detection signal (DIVCM) fed back to the feedback terminal of the difference control section (100).

From an output terminal of the digital subtractor (1002), the drive voltage command signal (DDRV) that is the digital signal supplied to the digital-to-analog converter (101) is generated (see FIG. 1).

According to another more specific embodiment, the one of circuit nodes, to which the one input terminal of the first comparator of the load short-circuit detection circuit is coupled, is any of output terminals of the digital subtractor of the difference control section, the first driver output amplifier, the second driver output amplifier, the digital-to-analog converter, and the drive current detection amplifier.

According to the most specific embodiment, the difference control section, the digital-to-analog converter, the driver output section, the drive current detection amplifier, the analog-to-digital converter, the decimation filter, and the offset calibration section are integrated into a semiconductor chip of a semiconductor integrated circuit (see FIG. 1).

[2] A typical embodiment from another aspect is a method for operating a motor drive controller including a difference control section (100), a driver output section (102), a drive current detection amplifier (103), and a load short-circuit detection circuit (108).

A motor (VCM) and sensing resistor (Rs) coupled in series can be coupled to an output terminal of the driver output section (102).

The difference control section (100) generates a driver voltage command signal (DDRV, ADRV) in response to a drive current command value (VCMCRNT) and a drive current detection signal (DIVCM), and supplies the same to an input terminal of the driver output section (102).

The driver output section (102) generates a drive output signal for driving the motor (VCM) and sensing resistor (Rs) coupled in series, in response to the driver voltage command signal (DDRV, ADRV) generated from the difference control section (100).

The drive current detection amplifier (103) generates the drive current detection signal (DIVCM), which is fed back to the difference control section (100), in response to a drive current (Ivcm) flowing through the sensing resistor (Rs).

An input terminal of the load short-circuit detection circuit (108) is coupled to the one of circuit nodes in a feedback loop including the difference control section (100), the driver output section (102), the motor (VCM) and sensing resistor (Rs) coupled in series, and the drive current detection amplifier (103).

The load short-circuit detection circuit (108) detects an abnormal oscillation waveform signal generated at the one of circuit nodes due to a short-circuit state between both ends of the motor (VCM) (see FIG. 1).

According to the embodiment, the detection of a short-circuit between both ends of a motor and the detection of an abnormal oscillation due to the short-circuit between the both ends are enabled.

2. Details of Embodiments

Next, the embodiments will be described in more detail. Note that, in all the drawings for explaining the preferred embodiments for implementing the present invention, the same symbol is attached to a component having the same function as that of the preceding drawing to omit repeating the explanation thereof.

[First Embodiment]

<<Configuration Overview of Semiconductor Integrated Circuit>>

FIG. 1 is a view showing the configuration of a semiconductor integrated circuit IC, called a voice coil motor driver, for driving a voice coil motor (VCM) that moves a magnetic head of a hard disk drive unit (HDD), according to a first embodiment. Note that, the semiconductor integrated circuit IC constitutes a motor drive controller.

Specifically, the semiconductor integrated circuit IC (driver IC) shown in FIG. 1 is a highly-integrated semiconductor integrated circuit, called a combo (COMBO) driver, having integrated therein a voice coil motor driver for driving a spindle motor that rotates a magnetic disk at a high speed and a spindle motor driver for driving the voice coil motor.

In the semiconductor chip of the semiconductor integrated circuit IC shown in FIG. 1, there are integrated a digital difference generation/phase compensation control section 100, a digital-to-analog converter 101, a driver output section 102, a drive current detection amplifier 103, an analog-to-digital converter 104, a decimation filter 105, an offset calibration section 106, a serial input/output interface 107, and a load short-circuit detection circuit 108.

For the semiconductor integrated circuit IC according to the first embodiment shown in FIG. 1, a voice coil motor (VCM) having a coil L and a parasitic resistor $R_L$ and a current sensing resistor Rs are coupled between first and second VCM driver output terminals VCMP and VCMN of the driver output section 102.

<<Detailed Configuration of Semiconductor Integrated Circuit>>

Hereinafter, the detailed configuration of the semiconductor integrated circuit IC according to the first embodiment shown in FIG. 1 will be described.

<<Digital Difference Generation/Phase Compensation Control Section>>

The digital difference generation/phase compensation control section 100 includes a digital amplifier 1001 constituted by a digital multiplier, a digital subtractor 1002, two digital multipliers 1003 and 1004, a digital integrator 1005, and a digital adder 1006.

The digital difference generation/phase compensation control section 100 generates current difference information IERR between command information of a digital drive current command value VCMCRNT supplied from a controller and feedback information of a digital drive current detection signal DIVCM generated from voice coil motor drive current information of the drive current detection amplifier 103, and generates the drive voltage command signals DDRV and ADRV supplied to an input of the driver output section 102.

The digital amplifier 1001 constituted by a digital multiplier digitally amplifies a digital drive current command value VCMCRNT supplied from a controller such as an external microcomputer, via the serial input/output interface 107. The digital drive current command value VCMCRNT digitally amplified by the digital amplifier 1001 is supplied to one input terminal of the digital subtractor 1002, and the digital drive current detection signal DIVCM generated from the digital amplifier 1063 of the offset calibration section 106 is supplied to other input terminal of the digital subtractor 1002. As a result, the digital difference drive current information IERR generated from the output terminal of the digital subtractor 1002 is supplied to one input terminal of the digital multiplier 1003 and one input terminal of the digital multiplier 1004.

In two control registers of the serial input/output interface 107, integration gain information IGAIN and proportional gain information PGAIN are stored in advance from a controller, such as an external microcomputer. Accordingly, the integration gain information IGAIN and the proportional gain information PGAIN are supplied to other input terminal of the digital multiplier 1003 and other input terminal of the digital multiplier 1004 from the serial input/output interface 107, respectively. As a result, the digital multiplier 1003 performs multiplication of the digital difference drive current information IERR of the digital subtractor 1002 and the integration gain information IGAIN of the serial input/output interface 107, and supplies this multiplication result to an input terminal of the digital integrator 1005. Furthermore, the digital multiplier 1004 performs multiplication of the digital difference drive current information IERR of the digital subtractor 1002 and the proportional gain information PGAIN of the serial input/output interface 107, and supplies this multiplication result to one input terminal of the digital adder 1006. Moreover, the digital difference drive current integration information is supplied to other input terminal of the digital adder 1006 from the output terminal of the digital integrator 1005, and the digital difference drive current proportion information is supplied to one input terminal of the digital adder 1006 from the output terminal of the digital multiplier 1004. Accordingly, digital difference drive current proportional integral information (proportional integral information) as the digital drive voltage command signal DDRV generated from the output terminal of the digital adder 1006 of the digital difference generation/phase compensation control section 100 is supplied to the input terminal of the digital-to-analog converter 101.

<<Digital-to-Analog Converter>>

In the semiconductor integrated circuit IC according to the first embodiment shown in FIG. 1, the digital drive voltage command signal DDRV generated from the output terminal of the digital adder 1006 of the digital difference generation/phase compensation control section 100 is converted to the analog drive voltage command signal ADRV by the digital-to-analog converter 101, and the analog drive voltage command signal ADRV is supplied to the input terminal of the driver output section 102.

As the digital-to-analog converter 101, a ΣΔ digital-to-analog converter capable of high speed and high resolution D/A conversion is used. Because most part of the configuration circuit of the ΣΔ digital-to-analog converter is a digital circuit, a reduction in power consumption and an increase in speed can be achieved by a fine semiconductor manufacturing process of the semiconductor integrated circuit IC. Furthermore, in the ΣΔ digital-to-analog converter, ΣΔ modulation generates a difference between a conversion output signal and an input signal, and this difference is integrated, and feedback processing is performed so that this integrated value becomes the minimum. As a result, as called a noise shaping effect, the quantization noises included in the output of the comparator of the ΣΔ digital-to-analog converter shift to a high frequency side, and thus a high S/N ratio can be achieved.

<<Driver Output Section>>

In the semiconductor integrated circuit IC according to the first embodiment shown in FIG. 1, in response to the analog drive voltage command signal ADRV from the digital-to-analog converter 101, the driver output section 102 drives the current sensing resistor Rs and the voice coil motor (VCM)

coupled between the first VCM driver output terminal VCMP and the second VCM driver output terminal VCMN. Note that the voice coil motor (VCM) includes, in series, the coil L and the parasitic resistor $R_L$.

As shown in FIG. 1, the driver output section 102 is constituted by a pre-driver 1021, a feedback capacitor 1022, a feedback resistor 1023, a PWM modulator 1024, a first VCM driver output amplifier 1025, a second VCM driver output amplifier 1026, and a feedback amplifier 1027.

The analog drive voltage command signal ADRV from the digital-to-analog converter 101 is supplied to a non-inverting input terminal(+) of the pre-driver 1021, and a feedback output signal of the feedback amplifier 1027 is supplied to an inverting input terminal(−) of the pre-driver 1021 via the feedback capacitor 1022 and the feedback resistor 1023. An output signal of the pre-driver 1021 is coupled to an input terminal of the PWM modulator 1024, and an output terminal of the PWM modulator 1024 is coupled to a first input terminal In1 of the first VCM driver output amplifier 1025 and a first input terminal In1 of the second VCM driver output amplifier 1026. Furthermore, the output signal of the pre-driver 1021 is supplied to a second input terminal In2 of the first VCM driver output amplifier 1025 and a second input terminal In2 of the second VCM driver output amplifier 1026.

Moreover, an output terminal of the first VCM driver output amplifier 1025 is coupled to the first VCM driver output terminal VCMP and an inverting input terminal(−) of the feedback amplifier 1027, and an output terminal of the second VCM driver output amplifier 1026 is coupled to the second VCM driver output terminal VCMN and a non-inverting input terminal(+) of the feedback amplifier 1027.

Furthermore, to the first VCM driver output amplifier 1025 and the second VCM driver output amplifier 1026, a PWM enable signal PWMENA is supplied from a controller such as an external microcomputer, via the serial input/output interface 107.

When the PWM enable signal PWMENA of a high level is supplied, the first VCM driver output amplifier 1025 and the second VCM driver output amplifier 1026 respond to a triangular waveform PWM carrier signal supplied to the first input terminal In1 from the PWM modulator 1024 and a pre-driver output signal supplied to the second input terminal In2 from the pre-driver 1021. Accordingly, the first VCM driver output amplifier 1025 and the second VCM driver output amplifier 1026 generate a drive pulse output signal with a pulse width proportional to a voltage level of the pre-driver output signal of the pre-driver 1021. At this time, a small bias voltage is supplied to an amplification transistor of the first VCM driver output amplifier 1025 and the second VCM driver output amplifier 1026 in response to the PWM enable signal PWMENA of a high level, and thus the amplification transistor can perform the class-D amplification operation and the power consumption of the amplification transistor can be reduced.

Note that, anti-phase drive pulse output signals are generated from the first VCM driver output amplifier 1025 and the second VCM driver output amplifier 1026, and the both terminals of the voice coil motor (VCM) are driven by these anti-phase drive pulse output signals. The pulse drive mode under this PWM control with varying drive pulse width is preferred when the amount of drive for moving the magnetic head, for example, in the seek operation or the like is large.

When the PWM enable signal PWMENA of a low level is supplied, the first VCM driver output amplifier 1025 and the second VCM driver output amplifier 1026 execute the linear drive mode in which an amplified output signal proportional to the voltage level of the pre-driver output signal of the pre-driver 1021 is generated. Accordingly, in this case, the first VCM driver output amplifier 1025 and the second VCM driver output amplifier 1026 do not respond to the triangular waveform PWM carrier signal supplied to the first input terminal In1 from the PWM modulator 1024. At this time, a large bias voltage is supplied to the amplification transistor of the first VCM driver output amplifier 1025 and the second VCM driver output amplifier 1026 in response to the PWM enable signal PWMENA of a low level, and thus the amplification transistor can execute the class-AB amplification operation and the distortion of the amplified signal of the amplification transistor can be reduced.

Note that, anti-phase linear amplification output signals are generated from the first VCM driver output amplifier 1025 and the second VCM driver output amplifier 1026, and the both terminals of the voice coil motor (VCM) are driven by these anti-phase linear amplification output signals. The linear drive mode under the analog control with a varying amplification amplitude is preferred when the amount of drive for moving the magnetic head, for example, in the track follow operation or the like is small.

The pre-driver 1021, the feedback capacitor 1022, the feedback resistor 1023, and the feedback amplifier 1027 included in the driver output section 102 shown in FIG. 1 function as a negative feedback loop for improving the amplification accuracy of the driver output section 102. When the first VCM driver output amplifier 1025 and the second VCM driver output amplifier 1026 operate also in both; the pulse drive mode and the linear drive mode, this negative feedback loop functions. That is, the feedback amplifier 1027 detects an interterminal amplified voltage between the output terminal of the first VCM driver output amplifier 1025 and the output terminal of the second VCM driver output amplifier 1026, and supplies the detected interterminal amplified voltage to the inverting input terminal(−) of the pre-driver 1021. Because the analog drive voltage command signal ADRV from the digital-to-analog converter 101 is supplied to the non-inverting input terminal(+) of the pre-driver 1021, the negative feedback loop functions so that voltage information about the inverting input terminal(−) of the pre-driver 1021 coincides with the voltage information about the non-inverting input terminal(+) of the pre-driver 1021. Accordingly, the analog drive voltage command signal ADRV of the non-inverting input terminal(+) of the pre-driver 1021 coincides with an amplified voltage between the both output terminals of the first and second VCM driver output amplifier 1025 and 1026 transmitted to the inverting input terminal(−) of the pre-driver 1021. Note that the feedback capacitor 1022 and the feedback resistor 1023 function as a phase compensation circuit for improving the stability of the negative feedback loop and also function as a filter for smoothing a pulse waveform output signal of the feedback amplifier 1027 during PWM operation.

<<Drive Current Detection Amplifier>>

In the semiconductor integrated circuit IC according to the first embodiment shown in FIG. 1, a voltage between the both terminals of the current sensing resistor Rs is supplied to differential input terminals of the drive current detection amplifier 103 via two current detection terminals; RSINP and RSINN. One current detection terminal RSINP is coupled to a non-inverting input terminal(+) of the differential amplifier 1031 of the drive current detection amplifier 103 via a resistor 1032, and a reference voltage $V_{REF}$ is supplied to the non-inverting input terminal(+) via a resistor 1033. Other current detection terminal RSINN is coupled to an inverting input terminal(−) of the differential amplifier 1031 of the drive current detection amplifier 103 via a resistor 1034, and this inverting input terminal(−) is coupled to an output terminal of the differential amplifier 1031 via a resistor 1035.

Accordingly, the drive current detection amplifier 103 detects the current value of a coil drive current Ivcm flowing through the current sensing resistor Rs coupled in series to the voice coil motor (VCM). The drive current information about the voice coil motor (VCM) is used as feedback information of the digital drive current detection signal DIVCM supplied to the digital difference generation/phase compensation control section 100.

<<Analog-to-Digital Converter>>

In the semiconductor integrated circuit IC according to the first embodiment shown in FIG. 1, an analog amplification output signal from the output terminal of the drive current detection amplifier 103 is converted to a digital current detection signal by the analog-to-digital converter 104, and the resulting digital current detection signal is supplied to an input terminal of the decimation filter 105.

As the analog-to-digital converter 104, an oversampling ΣΔ analog-to-digital converter capable of reducing aliasing noises and quantization noises and furthermore having a small scale of the circuit is used. This ΣΔ analog-to-digital converter can be constituted by an analog subtractor, an analog integrator, a comparator, a delay circuit, and a one-bit local digital-to-analog converter, and thus can reduce the scale of the circuit. Furthermore, even with the ΣΔ analog-to-digital converter, the difference generation, difference integration, and an integrated value feedback processing are executed, and thus high S/N ratio can be achieved by the noise shaping effect.

<<Decimation Filter>>

The decimation filter 105 of the semiconductor integrated circuit IC according to the first embodiment shown in FIG. 1 executes decimation processing in order to reduce the sampling rate which is increased by the above-described oversampling ΣΔ analog-to-digital converter 104, down to an appropriate sampling rate. Moreover, the decimation filter 105 functions as a low pass filter for suppressing the quantization noise in the high frequency region which is increased by the amount of a decrease in the quantization noise in the low frequency region because of the noise shaping effect by the ΣΔ analog-to-digital converter 104. Accordingly, the decimation filter 105 is constituted by a digital filter, and is particularly constituted by a low pass filter and a decimation circuit.

<<Offset Calibration Section>>

The offset calibration section 106 of the semiconductor integrated circuit IC according to the first embodiment shown in FIG. 1, prior to the feedback control by the above-described digital difference generation/phase compensation control section 100, executes a calibration operation for reducing errors of the drive current detection amplifier 103, the analog-to-digital converter 104, and the decimation filter 105. In order to execute this operation, the current value of the drive current Ivcm of the voice coil motor (VCM) is controlled to be zero, and the voltage between the both terminals of the current sensing resistor Rs is supplied to the differential input terminals of the drive current detection amplifier 103 via two current detection terminals RSINP and RSINN. In this state, total error information of an error of the drive current detection amplifier 103, an error of the analog-to-digital converter 104, and an error of the decimation filter 105 is stored into a calibration register 1061 of the offset calibration section 106. In response to a calibration enable signal CALENA, the above-described total error information is stored from the decimation filter 105 to the calibration register 1061 of the offset calibration section 106, and is held there.

In the subsequent drive current detection operation, the error information held in the calibration register 1061 of the offset calibration section 106 is supplied to the digital subtractor 1062, and in the digital subtractor 1062, the error information in the calibration register 1061 is subtracted from whole normal detection information. The whole normal detection information includes all of a normal output signal of the drive current detection amplifier 103, a normal conversion signal of the analog-to-digital converter 104, and a normal output signal of the decimation filter 105. A subtraction output signal of the digital subtractor 1062 of the offset calibration section 106 is digitally amplified by the digital amplifier 1063 constituted by a digital multiplier, and thus the digital drive current detection signal DIVCM is generated from the output of the digital amplifier 1063. Accordingly, an error component included in the digital drive current detection signal DIVCM generated from the output of the digital amplifier 1063 of the offset calibration section 106 can be sufficiently reduced.

<<Load Short-Circuit Detection Circuit>>

The load short-circuit detection circuit 108 included in the semiconductor integrated circuit IC according to the first embodiment shown in FIG. 1 includes a first comparator 1081, a counter 1082, and a second comparator 1083.

To a non-inverting input terminal(+) and an inverting input terminal(−) of the first comparator 1081 constituted as a digital comparator, the digital difference drive current information IERR generated from the digital subtractor 1002 and a digital current threshold value ITH generated from the serial input/output interface 107 are supplied, respectively. A comparison output signal of the first comparator 1081 constituted as a digital comparator is supplied to a count input terminal of the counter 1082, and a shut-down enable signal SHTD_ENA of a high level is supplied to a reset input terminal rstn of the counter 1082 at a substantially constant time interval. To a non-inverting input terminal(+) and an inverting input terminal(−) of the second comparator 1083 constituted as a digital comparator, a count output signal of the counter 1082 and a digital count threshold value NTH generated from the serial input/output interface 107 are supplied, respectively. Furthermore, from an output terminal of the second comparator 1083 constituted as a digital comparator, a shutdown detection signal SHT_DET as a load short-circuit detection signal is generated.

<<Operation of Load Short-Circuit Detection Circuit in Normal Operation State>>

Next, hereinafter, there will be described the operation of the load short-circuit detection circuit 108 included in the semiconductor integrated circuit IC according to the first embodiment shown in FIG. 1, in a normal operation state where the both ends of the voice coil motor (VCM) are in a non-short-circuit state.

Assume a case where the both ends of the voice coil motor (VCM) are not short-circuited in both cases of the seek operation of the magnetic head (when the PWM enable signal PWMENA is at a high level) and the track follow operation (when the PWM enable signal PWMENA is at a low level). In this case, due to the operation of the digital difference generation/phase compensation control section 100 that feedback-controls the drive current Ivcm of the coil of the voice coil motor (VCM) of the hard disk drive unit (HDD), the current difference information IERR between the digital drive current command value VCMCRNT and the digital drive current detection signal DIVCM becomes substantially zero. That is, due to the operation of the digital difference generation/phase compensation control section 100, the current difference information IERR between the command information of the digital drive current command value VCMCRNT supplied from a controller and the feedback information of the digital drive current detection signal DIVCM generated from the voice coil motor drive current information of the drive current detection amplifier 103 is feedback-controlled so as to be substantially zero. As a result, such a feedback operation of the digital difference generation/phase compensation control section 100 sets the current value of the drive current Ivcm of the coil of the voice coil motor (VCM).

As described above, in the normal operation state where the both ends of the voice coil motor (VCM) are in a non-short-circuit state, the current difference information IERR generated from the digital subtractor 1002 of the digital difference generation/phase compensation control section 100 becomes substantially zero. Accordingly, the digital value of the digital difference drive current information IERR supplied to the non-inverting input terminal(+) of the first comparator 1081 of the load short-circuit detection circuit 108 becomes a value smaller than the digital current threshold value ITH supplied to the inverting input terminal(−) of the first comparator 1081 of the load short-circuit detection circuit 108. As a result, the counter 1082, without counting up, is maintained at the value of zero that is a count initial value, in response to the shut-down enable signal of a high level that is supplied to the reset input terminal rstn at a substantially constant time interval. Accordingly, the value of zero that is the count initial value of an output of the counter 1082 supplied to the non-inverting input terminal(+) of the second comparator 1083 of the load short-circuit detection circuit 108 becomes a value smaller than the digital count threshold value NTH supplied to the inverting input terminal(−) of the second comparator 1083. Accordingly, the shutdown detection signal SHT_DET as the load short-circuit detection signal generated from the output terminal of the second comparator 1083 of the load short-circuit detection circuit 108 becomes at a low level. As a result, a controller, such as a microcomputer, externally coupled to the serial input/output interface 107 of the semiconductor integrated circuit IC shown in FIG. 1 recognizes, from the shutdown detection signal SHT_DET of a low level, that the both ends of the voice coil motor (VCM) are in a non-short-circuit state and in the normal operation state, and continues the feedback control operation of the drive current Ivcm of the coil of the voice coil motor (VCM).

<<Operation of Load Short-Circuit Detection Circuit in Abnormal Operation State>>

Next, hereinafter, there will be described the operation of the load short-circuit detection circuit 108 included in the semiconductor integrated circuit IC according to the first embodiment shown in FIG. 1, in an abnormal operation state where the both ends of the voice coil motor (VCM) are in a short-circuit state.

Assume that the both ends of the voice coil motor (VCM) are in a short-circuit state in both cases of the seek operation of the magnetic head (when the PWM enable signal PWMENA is at a high level) and the track follow operation (when the PWM enable signal PWMENA is at a low level). In this case, short-circuiting of the both ends of the voice coil motor (VCM) puts the voice coil motor driver into an extremely light load state, and thus the phase margin becomes insufficient in feedback-controlling the drive current of the coil of the voice coil motor and an abnormal oscillation is generated. Due to this abnormal oscillation, an abnormal oscillation waveform signal having a relatively large amplitude is generated at the one of circuit nodes in a feedback loop from the output terminal of the digital subtractor 1002 of the digital difference generation/phase compensation control section 100 to one input terminal of the digital subtractor 1002.

In a state where this abnormal oscillation is generated, even with the operation of the digital difference generation/phase compensation control section 100 that feedback-controls the drive current Ivcm of the coil of the voice coil motor (VCM), it becomes impossible to control the current difference information IERR between the digital drive current command value VCMCRNT and the digital drive current detection signal DIVCM, to be substantially zero. That is, even if the digital difference generation/phase compensation control section 100 operates, it becomes impossible to execute the feedback control so that the current difference information IERR between the command information of the digital drive current command value VCMCRNT supplied from a controller and the feedback information of the digital drive current detection signal DIVCM generated from the voice coil motor drive current information of the drive current detection amplifier 103 becomes substantially zero.

As described above, in an abnormal operation state where the both ends of the voice coil motor (VCM) are in a short-circuit state, the current difference information IERR generated from the digital subtractor 1002 of the digital difference generation/phase compensation control section 100 does not become substantially zero. Accordingly, a digital value of the digital difference drive current information IERR supplied to the non-inverting input terminal(+) of the first comparator 1081 of the load short-circuit detection circuit 108 becomes an instantaneous value larger than the digital current threshold value ITH supplied to the inverting input terminal(−) of the first comparator 1081 of the load short-circuit detection circuit 108, at an abnormal oscillation cycle determined by an abnormal oscillation frequency. As a result, from the output terminal of the first comparator 1081 of the load short-circuit detection circuit 108, a comparison output pulse signal of a high level is generated at the above-described abnormal oscillation cycle. Therefore, in response to the comparison output pulse signal of a high level generated at the abnormal oscillation cycle, the counter 1082 counts up and the count-up value of the counter 1082 increases from the zero value of a count initial value. Thus, the count-up value of the counter 1082 supplied to the non-inverting input terminal(+) of the second comparator 1083 of the load short-circuit detection circuit 108 becomes a value larger than the digital count threshold value NTH supplied to the inverting input terminal (−) of the second comparator 1083. Accordingly, the shutdown detection signal SHT_DET as the load short-circuit detection signal generated from the output terminal of the second comparator 1083 of the load short-circuit detection circuit 108 becomes a high level. As a result, a controller such as a microcomputer, externally coupled to the serial input/output interface 107 of the semiconductor integrated circuit IC shown in FIG. 1 recognizes, from the shutdown detection signal SHT_DET of a high level, that the both ends of the voice coil motor (VCM) are in a short-circuit state and in an abnormal operation state, and terminates the feedback control operation of the drive current Ivcm of the coil of the voice coil motor (VCM). For example, a controller such as a microcomputer, stops the operation of the driver output section 102 in response to the shutdown detection signal SHT_DET of a high level. Thereby, the feedback control operation of the current value of the drive current Ivcm of the coil of the voice coil motor (VCM) is terminated.

With the above-described semiconductor integrated circuit IC according to the first embodiment shown in FIG. 1, in an abnormal operation state where the both ends of the voice coil motor (VCM) are in a short-circuit state, the feedback control operation of the current value of the drive current Ivcm of the coil of the voice coil motor (VCM) can be terminated. Accordingly, with the semiconductor integrated circuit IC according to the first embodiment shown in FIG. 1, when both ends of the voice coil motor (VCM) are in a short-circuit state, smoke generation or firing of the voice coil motor driver for driving the voice coil motor (VCM) can be prevented.

Furthermore, in the semiconductor integrated circuit IC according to the first embodiment shown in FIG. 1, a load short-circuit detection operation of whether or not the both ends of the voice coil motor (VCM) (VCM) are in a short-circuit state is executed before the magnetic head is moved to the disk-medium surface from the retract position of the ramp mechanism by a loading operation in accordance with an instruction from a host in order to perform read/write operations in the hard disk drive unit (HDD). In other method, the load short-circuit detection operation of whether or not the both ends of the voice coil motor (VCM) are in a short-circuit state is executed after the above-described loading operation and prior to the seek operation in which the amount of drive for moving the magnetic head is large.

<<Characteristics in Normal Operation State>>

FIG. 2 is a view showing the characteristics in the normal operation state where both ends of the voice coil motor (VCM) are in a non-short-circuit state when the semiconductor integrated circuit IC according to the first embodiment shown in FIG. 1 executes an operation for feedback-controlling the current value of the drive current Ivcm of a coil of the voice coil motor (VCM).

FIG. 2A shows the frequency characteristics of the load of the voice coil motor (VCM) driven by the semiconductor integrated circuit IC according to the first embodiment shown in FIG. 1, in the normal operation state where the both ends of the voice coil motor (VCM) are in a non-short-circuit state.

As shown in FIG. 2A, in a frequency band sufficiently lower than a pole frequency $fp=R_L/(2\pi L)$ determined by the coil L and the parasitic resistor $R_L$ of the voice coil motor (VCM), the gain of the voice coil motor (VCM) is determined by the current sensing resistor Rs and the parasitic resistor $R_L$ as $Gain=1/(Rs/R_L)$. In a frequency band sufficiently higher than this pole frequency $fp=R_L/(2\pi L)$, the gain Gain of the voice coil motor (VCM) decreases in response to an increase in the frequency in accordance with a first-order integration characteristics. Note that, at the frequency equal to the pole frequency $fp=R_L/(2\pi L)$, the denominator of a transfer function determining the gain Gain of the voice coil motor (VCM) becomes substantially zero, and this frequency is called a pole.

FIG. 2B shows a frequency characteristics of the digital difference generation/phase compensation control section 100 of the semiconductor integrated circuit IC according to the first embodiment shown in FIG. 1, in the normal operation state where the both ends of the voice coil motor (VCM) are in a non-short-circuit state.

As shown in FIG. 2B, the gain Gain of the digital difference generation/phase compensation control section 100 decreases in accordance with an increase in the frequency, and a frequency at which the numerator of the transfer function determining the gain Gain of the digital difference generation/phase compensation control section 100 becomes substantially zero is called a zero point. In particular, a zero point frequency fz of the digital difference generation/phase compensation control section 100 is set substantially equal to the pole frequency $fp=R_L/(2\pi L)$ of the gain Gain of the voice coil motor (VCM) shown in FIG. 2A. Accordingly, as shown in FIG. 2B, in the frequency band sufficiently lower than the zero point frequency fz (the pole frequency fp), the gain Gain of the digital difference generation/phase compensation control section 100 decreases in response to an increase in the frequency in accordance with the first-order integral characteristics depending on the integration gain information IGAIN of the digital integrator 1005. Moreover, in the frequency band sufficiently higher than this zero point frequency fz (the pole frequency fp), the gain Gain of the digital difference generation/phase compensation control section 100 is maintained at a value substantially independent of a change in the frequency in accordance with the proportional gain information PGAIN of the digital multiplier 1004.

FIG. 2C shows a combined frequency characteristics of the other circuit portions of the semiconductor integrated circuit IC according to the first embodiment shown in FIG. 1, in the normal operation state where the both ends of the voice coil motor (VCM) are in a non-short-circuit state. Note that, the other circuit portions of the semiconductor integrated circuit IC according to the first embodiment shown in FIG. 1 include the digital-to-analog converter 101, the driver output section 102, the drive current detection amplifier 103, the analog-to-digital converter 104, the decimation filter 105, and the offset calibration section 106.

As shown in FIG. 2C, the gain Gain of the other circuit portions is maintained at a value substantially independent of a change in the frequency until the frequency reaches a frequency band considerably higher than the pole frequency $fp=R_L/(2\pi L)$ determined by the coil L and the parasitic resistor $R_L$ of the voice coil motor (VCM). However, in a frequency band further higher than the considerably high frequency band, the gain Gain of the other circuit portions abruptly decreases in response to an increase in the frequency in accordance with a high-order integral characteristics.

FIG. 2D shows an overall frequency characteristics of the semiconductor integrated circuit IC according to the first embodiment shown in FIG. 1, in the normal operation state where the both ends of the voice coil motor (VCM) are in a non-short-circuit state. Note that, the overall frequency characteristics of the semiconductor integrated circuit IC according to the first embodiment shown in FIG. 2D is the frequency characteristics obtained by overlapping with the frequency characteristics of the load of the voice coil motor (VCM) shown in FIG. 2A, the frequency characteristics of the digital difference generation/phase compensation control section 100 shown in FIG. 2B, and the combined frequency characteristics of the other circuit portions shown in FIG. 2C.

As shown in FIG. 2D, in the overall frequency characteristics of the semiconductor integrated circuit IC according to the first embodiment shown in FIG. 1, the pole of the gain Gain of the voice coil motor (VCM) shown in FIG. 2A and the zero point of the gain Gain of the digital difference generation/phase compensation control section 100 shown in FIG. 2B are cancelled out. As a result, the overall frequency characteristics of the semiconductor integrated circuit IC shown in FIG. 2D becomes a first-order integral characteristics from the low frequency band to a cut-off frequency f0 at which the gain Gain becomes 0 dB, and the phase at the cut-off frequency f0 at which the gain Gain becomes 0 dB has a sufficient phase margin with respect to −180°, and thus the closed loop characteristics become stable.

<<Characteristics in Abnormal Operation State>>

FIG. 3 is a view showing the characteristics in an abnormal operation state where both ends of the voice coil motor (VCM) are in a short-circuit state when the semiconductor integrated circuit IC according to the first embodiment shown in FIG. 1 executes an operation for feedback-controlling the current value of the drive current Ivcm of a coil of the voice coil motor (VCM).

Figure 3A:
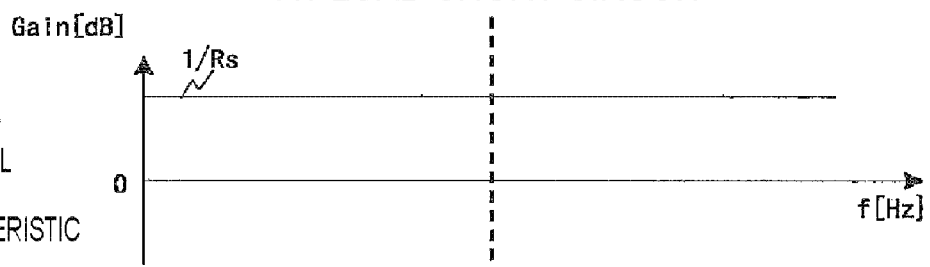
FIGS. 3A-3D are views showing the characteristics in an abnormal operation state where both ends of the voice coil motor (VCM) are in a short-circuit state when the semiconductor integrated circuit IC according to the first embodiment shown in FIG. 1 performs an operation for feedback-controlling the current value of the drive current Ivcm of a coil of the voice coil motor (VCM)

FIG. 3A shows the frequency characteristics of the load of the voice coil motor (VCM) driven by the semiconductor integrated circuit IC according to the first embodiment shown in FIG. 1, in an abnormal operation state where the both ends of the voice coil motor (VCM) are in a short-circuit state.

As shown in FIG. 3A, the coil L and the parasitic resistor $R_L$ become substantially zero, respectively, due to the short circuit between the both ends of the voice coil motor (VCM), and thus the voice coil motor characteristics become a large gain Gain=1/(Rs), and also the pole disappears in the gain frequency characteristics, and the large gain Gain=1/(Rs) is maintained until the frequency reaches an extremely high frequency.

Figure 3B:
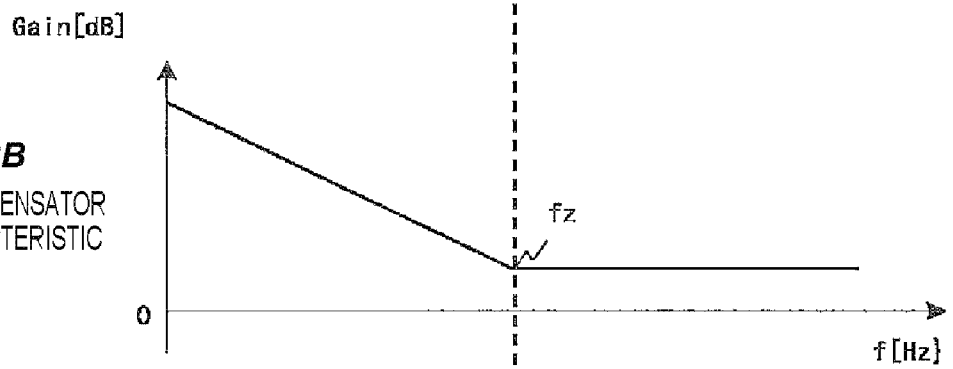

FIG. 3B shows the frequency characteristics of the digital difference generation/phase compensation control section 100 of the semiconductor integrated circuit IC according to the first embodiment shown in FIG. 1, in the abnormal operation state where the both ends of the voice coil motor (VCM) are in a short-circuit state.

The gain Gain of the digital difference generation/phase compensation control section 100 in an abnormal operation state of a short-circuit state shown in FIG. 3B decreases in accordance with an increase in the frequency, as with the gain Gain in the normal operation state of the non-short-circuit state shown in FIG. 2B. That is, as shown in FIG. 3B, in a frequency band sufficiently lower than the zero point frequency fz, the gain Gain of the digital difference generation/phase compensation control section 100, in the normal operation state of a non-short-circuit state decreases in response to an increase in the frequency in accordance with the first-order integral characteristics depending on the integration gain information IGAIN of the digital integrator 1005. Moreover, in a frequency band sufficiently higher than this zero point frequency fz, the gain Gain of the digital difference generation/phase compensation control section 100 in the normal operation state of a non-short-circuit state is maintained at a value substantially independent of a change in the frequency in accordance with the proportional gain information PGAIN of the digital multiplier 1004.

Figure 3C:
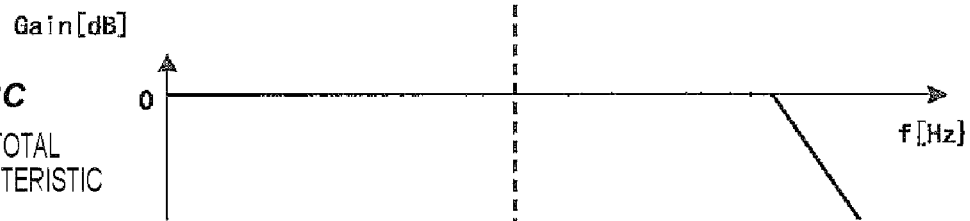

FIG. 3C shows the combined frequency characteristics of the other circuit portions of the semiconductor integrated circuit IC according to the first embodiment shown in FIG. 1, in the abnormal operation state where the both ends of the voice coil motor (VCM) are in a short-circuit state. Note that, the other circuit portions of the semiconductor integrated circuit IC according to the first embodiment shown in FIG. 1 include the digital-to-analog converter 101, the driver output section 102, a drive current detection amplifier 103, the analog-to-digital converter 104, a decimation filter 105, and the offset calibration section 106.

As shown in FIG. 3C, until the frequency reaches a frequency band considerably higher than the zero point frequency fz, the gain Gain of the other circuit portions in the abnormal operation state of a short-circuit state is maintained at a value substantially independent of a change in the frequency. However, in a frequency band further higher than the considerably high frequency band, the gain Gain of the other circuit portions in the abnormal operation state of a short-circuit state abruptly decreases in response to an increase in the frequency in accordance with high-order integral characteristics.

Figure 3D:
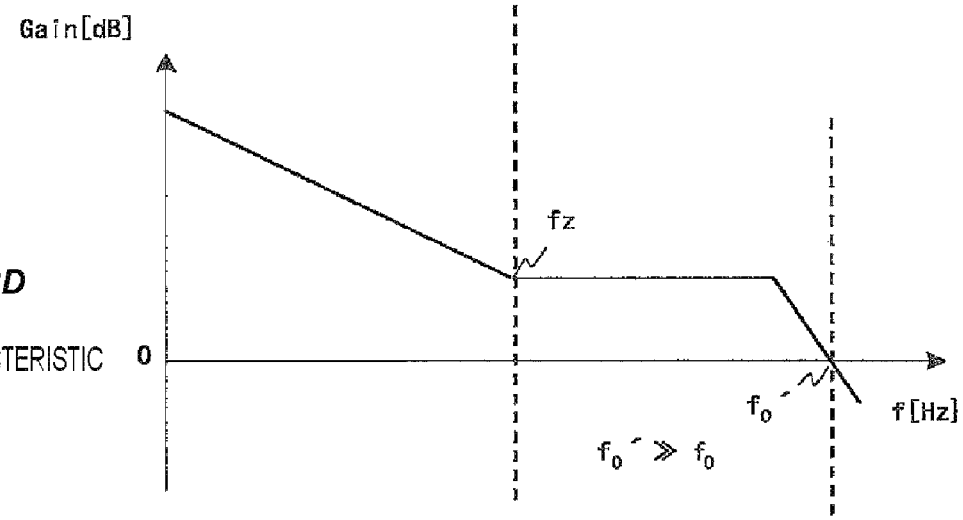

FIG. 3D shows the overall frequency characteristics of the semiconductor integrated circuit IC according to the first embodiment shown in FIG. 1, in the abnormal operation state where the both ends of the voice coil motor (VCM) are in a short-circuit state. Note that the overall frequency characteristics of the semiconductor integrated circuit IC according to the first embodiment shown in FIG. 3D are the frequency characteristics obtained by overlapping the frequency characteristics of the load of the voice coil motor (VCM) shown in FIG. 3A, the frequency characteristics of the digital difference generation/phase compensation control section 100 shown in FIG. 3B, and the combined frequency characteristics of the other circuit portions shown in FIG. 3C.

As shown in FIG. 3D, the overall frequency characteristics in the abnormal operation state of a short-circuit state of the semiconductor integrated circuit IC according to the first embodiment shown in FIG. 1 have a relatively large gain Gain between the zero point frequency fz and a cut-off frequency f0' of a frequency higher than the cut-off frequency f0 shown in FIG. 2D. As a result, the phase at the cut-off frequency f0' of a high frequency, at which the gain Gain becomes 0 dB, does not have a sufficient phase margin with respect to −180°, and thus the closed loop characteristics become unstable and an abnormal oscillation is generated.

<<Abnormal Oscillation Waveform in Abnormal Operation State>>

Figure 4:
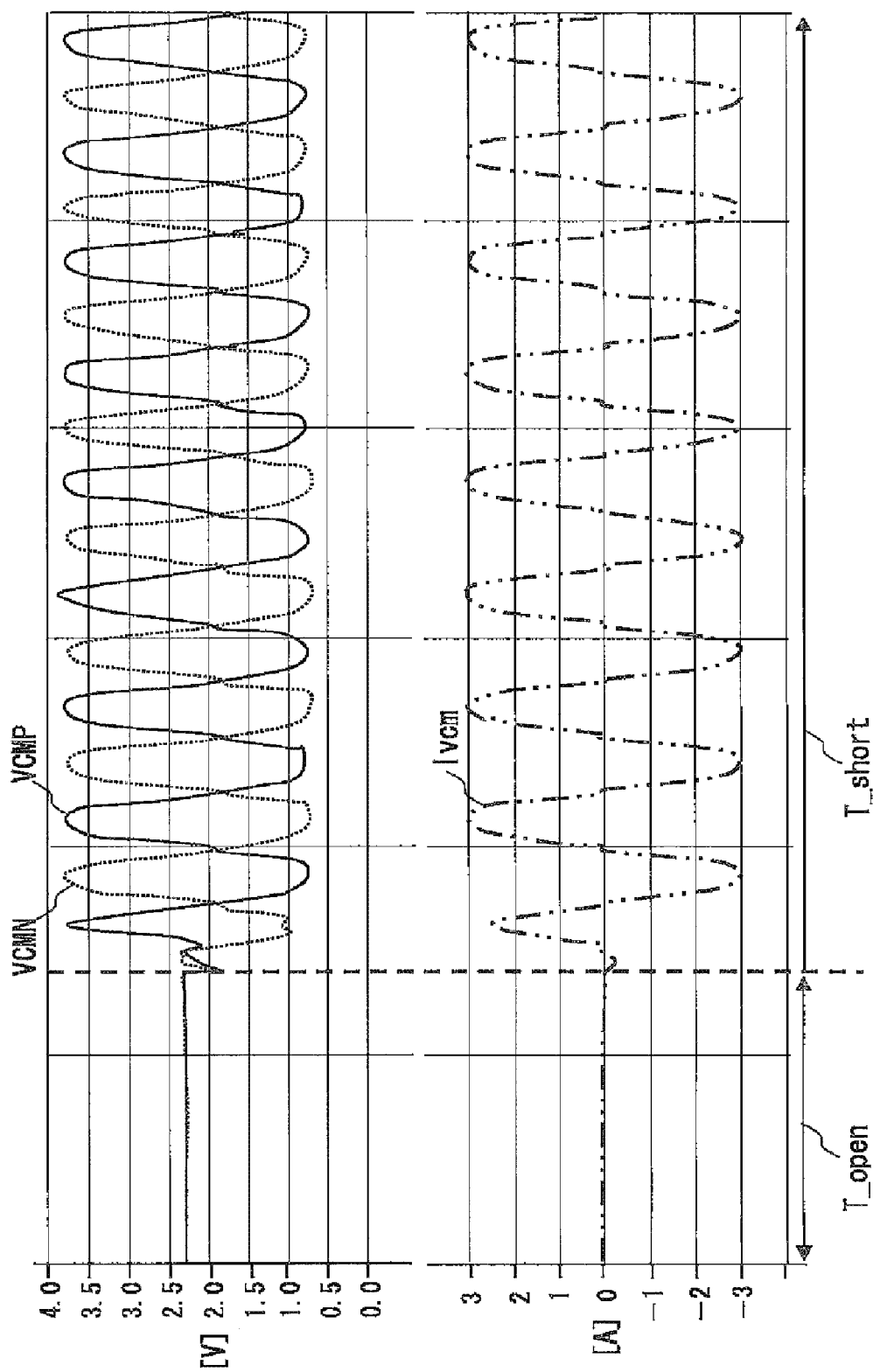
FIG. 4 is a view showing the waveforms in an abnormal oscillation caused by both ends of the voice coil motor (VCM) becoming in an abnormal operation state, i.e., in a short-circuit state, when the semiconductor integrated circuit IC according to the first embodiment shown in FIG. 1 performs an operation for feedback-controlling the current value of the drive current Ivcm of a coil of the voice coil motor (VCM)

FIG. 4 is a view showing the waveforms in an abnormal oscillation caused by both ends of the voice coil motor (VCM) becoming in an abnormal operation state, i.e., in a short-circuit state, when the semiconductor integrated circuit IC according to the first embodiment shown in FIG. 1 executes an operation for feedback-controlling the current value of the drive current Ivcm of a coil of the voice coil motor (VCM).

The upper part of FIG. 4 shows the voltage waveforms of the first VCM driver output terminal voltage VCMP and the second VCM driver output terminal voltage VCMN of the driver output section 102, and the lower part of FIG. 4 shows the current waveform of the coil drive current Ivcm flowing through the current sensing resistor Rs coupled in series to the voice coil motor (VCM).

A period T_open shown in FIG. 4 on the left indicates the normal operation state where the both ends of the voice coil motor (VCM) are in a non-short-circuit state (an open state), and the first VCM driver output terminal voltage VCMP and the second VCM driver output terminal voltage VCMN of the driver output section 102 are maintained at a stable voltage and the coil drive current Ivcm is maintained at a stable current.

A period T_short in the center and on the right shown in FIG. 4 indicates the abnormal operation state where the both ends of the voice coil motor (VCM) are in a short-circuit state (a short state), in which the first VCM driver output terminal voltage VCMP and the second VCM driver output terminal voltage VCMN of the driver output section 102 vary at an oscillation voltage of a large amplitude and the coil drive current Ivcm varies at an oscillation current of a large amplitude.

The shutdown detection signal SHT_DET as the load short-circuit detection signal, which is generated from the output terminal of the second comparator 1083 of the load short-circuit detection circuit 108 of the semiconductor integrated circuit IC according to the first embodiment shown in FIG. 1 in response to an abnormal oscillation generated in this manner in the period T_short shown in FIG. 4, becomes a high level. As a result, a controller, such as a microcomputer, externally coupled to the serial input/output interface 107 of the semiconductor integrated circuit IC shown in FIG. 1 recognizes, from the shutdown detection signal SHT_DET of a high level, that the both ends of the voice coil motor (VCM)

are in a short-circuit state and in an abnormal operation state, and terminates the feedback control operation of the drive current Ivcm of the coil of the voice coil motor (VCM). For example, the controller stops the operation of the driver output section 102 in response to the shutdown detection signal SHT_DET of a high level. Thereby, the feedback control operation of the current value of the drive current Ivcm of the coil of the voice coil motor (VCM) is terminated. Accordingly, with the semiconductor integrated circuit IC according to the first embodiment shown in FIG. 1, when the both ends of the voice coil motor (VCM) are in a short-circuit state, it is possible to prevent smoke generation or firing of the voice coil motor driver for driving the voice coil motor (VCM).

[Second Embodiment]

Figure 5:
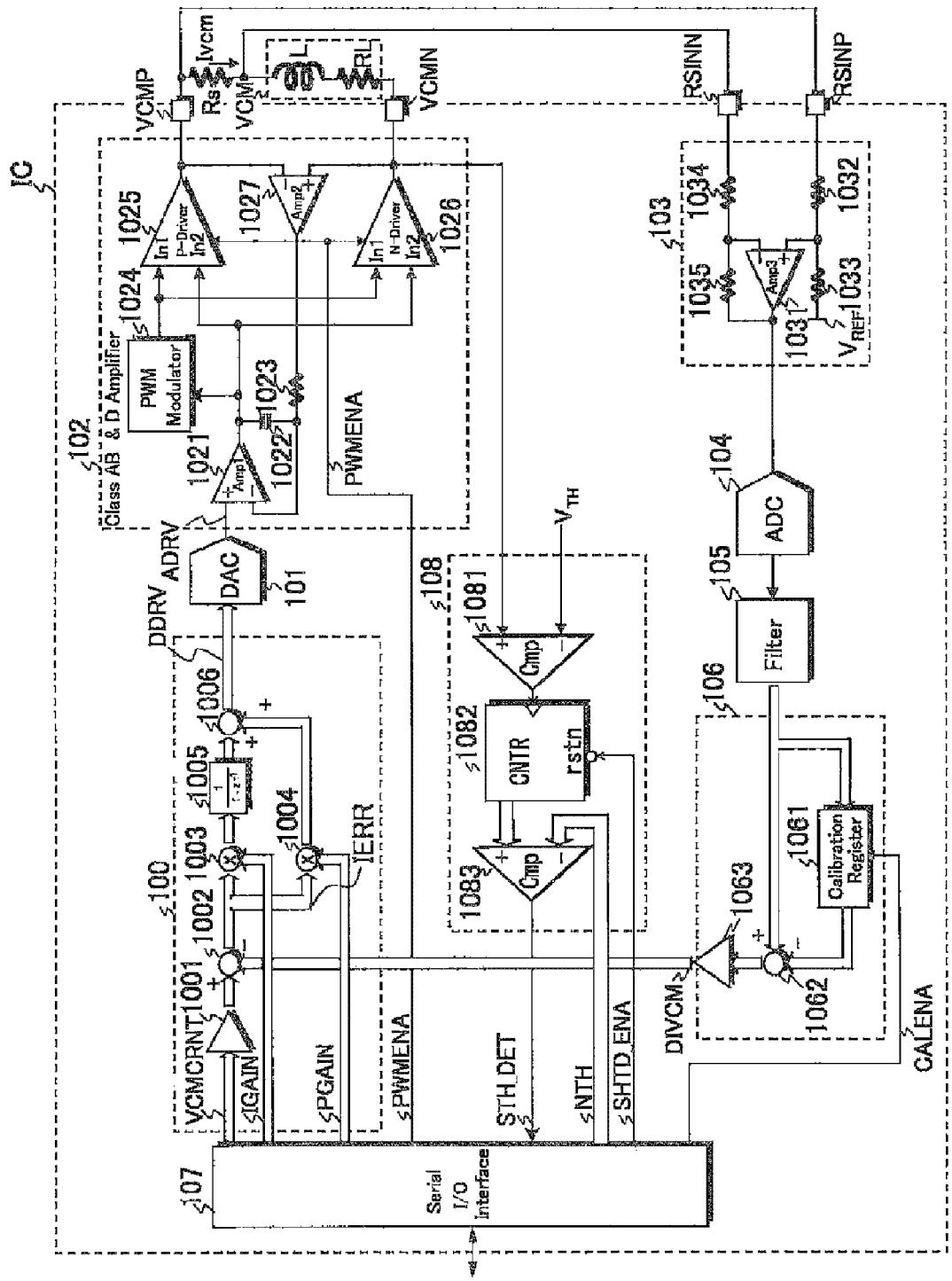
FIG. 5 is a view showing the configuration of a semiconductor integrated circuit IC, called a voice coil motor drive, for driving the voice coil motor (VCM) that moves a magnetic head of the hard disk drive unit (HDD), according to a second embodiment.

FIG. 5 is a view showing the configuration of a semiconductor integrated circuit IC, called a voice coil motor drive, for driving the voice coil motor (VCM) that moves a magnetic head of the hard disk drive unit (HDD), according to a second embodiment.

The semiconductor integrated circuit IC according to the second embodiment shown in FIG. 5 differs from the semiconductor integrated circuit IC according to the first embodiment shown in FIG. 1, in the following points.

That is, the load short-circuit detection circuit 108 of the semiconductor integrated circuit IC according to the second embodiment shown in FIG. 5 includes the first comparator 1081, the counter 1082, and the second comparator 1083.

To the non-inverting input terminal(+) and the inverting input terminal(−) of the first comparator 1081 constituted as an analog comparator, the second VCM driver output terminal voltage VCMN of the driver output section 102 and an analog voltage threshold value $V_{TH}$ are supplied, respectively. The comparison output signal of the first comparator 1081 constituted as an analog comparator is supplied to the count input terminal of the counter 1082, and the shut-down enable signal SHTD_ENA of a high level is supplied to the reset input terminal rstn of the counter 1082, at a substantially constant time interval.

The count output signal of the counter 1082 and the digital count threshold value NTH generated from the serial input/output interface 107 are supplied to the non-inverting input terminal(+) and the inverting input terminal(−) of the second comparator 1083 constituted as a digital comparator, respectively. Furthermore, from the output terminal of the second comparator 1083 constituted as a digital comparator, the shut-down detection signal SHT_DET as the load short-circuit detection signal is generated.

<<Operation of Load Short-Circuit Detection Circuit in Abnormal Operation State>>

Next, hereinafter, there will be described the operation of the load short-circuit detection circuit 108 included in the semiconductor integrated circuit IC according to the second embodiment shown in FIG. 5, in an abnormal operation state where the both ends of the voice coil motor (VCM) are in a short-circuit state.

Assume the case where the both ends of the voice coil motor (VCM) are in a short-circuit state in the case of the track follow operation of the magnetic head (when the PWM enable signal PWMENA is at a low level). In this case, short-circuiting of the both ends of the voice coil motor (VCM) puts the voice coil motor driver into an extremely light load state, and thus the phase margin becomes insufficient in feedback-controlling the drive current of a coil of the voice coil motor and an abnormal oscillation is generated. Due to this abnormal oscillation, an abnormal oscillation waveform signal having a relatively large amplitude is generated at one of the circuit nodes in a feedback loop, from the output terminal of the digital subtractor 1002 of the digital difference generation/phase compensation control section 100 to one input terminal of the digital subtractor 1002.

In the state where this abnormal oscillation is generated, as described in FIG. 4, the first VCM driver output terminal voltage VCMP and the second VCM driver output terminal voltage VCMN of the driver output section 102 vary at an oscillating voltage of a large amplitude.

Accordingly, the analog voltage of the second VCM driver output terminal voltage VCMN of the driver output section 102 supplied to the non-inverting input terminal(+) of the first comparator 1081 of the load short-circuit detection circuit 108 has, at an abnormal oscillation cycle determined by an abnormal oscillation frequency, an instantaneous value larger than the analog voltage threshold value $V_{TH}$ supplied to the inverting input terminal(−) of the first comparator 1081 of the load short-circuit detection circuit 108. As a result, from the output terminal of the first comparator 1081 of the load short-circuit detection circuit 108, the comparison output pulse signal of a high level is generated at the above-described abnormal oscillation cycle. Accordingly, in response to the comparison output pulse signal of a high level generated at the abnormal oscillation cycle, the counter 1082 counts up and the count-up value of the counter 1082 increases from the zero value of a count initial value. Therefore, the count-up value of the counter 1082 supplied to the non-inverting input terminal(+) of the second comparator 1083 of the load short-circuit detection circuit 108 becomes a value larger than the digital count threshold value NTH supplied to the inverting input terminal(−) of the second comparator 1083. Accordingly, the shutdown detection signal SHT_DET as the load short-circuit detection signal generated from the output terminal of the second comparator 1083 of the load short-circuit detection circuit 108 becomes a high level. As a result, a controller such as a microcomputer externally coupled to the serial input/output interface 107 of the semiconductor integrated circuit IC shown in FIG. 5 recognizes, from the shutdown detection signal SHT_DET of a high level, that the both ends of the voice coil motor (VCM) are in a short-circuit state and in an abnormal operation state, and terminates the feedback control operation of the drive current Ivcm of the coil of the voice coil motor (VCM). For example, a controller such as a microcomputer sets the digital value of the command information of the digital drive current command value VCMCRNT to a zero value in response to the shutdown detection signal SHT_DET of a high level. Thereby, the feedback control operation of the current value of the drive current Ivcm of the coil of the voice coil motor (VCM) is terminated.

Note that, as other operation termination method, in response to the shutdown detection signal SHT_DET of a high level of the load short-circuit detection circuit 108, the operation of the digital difference generation/phase compensation control section 100 can be stopped, or the operation of the digital-to-analog converter 101 can be stopped, or the operation of the driver output section 102 can be stopped. Furthermore, in the semiconductor integrated circuit IC according to the second embodiment shown in FIG. 5, the first VCM driver output terminal voltage VCMP of the driver output section 102 can be supplied to the non-inverting input terminal(+) of the first comparator 1081 constituted as an analog comparator.

With the above-described semiconductor integrated circuit IC according to the second embodiment shown in FIG. 5, in an abnormal operation state where the both ends of the voice coil motor (VCM) are in a short-circuit state, the feedback control operation of the current value of the drive current Ivcm of the coil of the voice coil motor (VCM) can be terminated. Accordingly, with the semiconductor integrated circuit IC according to the fourth embodiment shown in FIG. 7, smoke generation or firing of the voice coil motor driver for driving the voice coil motor (VCM) can be prevented in a state where both ends of the voice coil motor (VCM) are short-circuited. Note that, in the case of the seek operation (when the PWM enable signal PWMENA is at a high level), the output terminal voltage VCMN itself of the second VCM driver output amplifier 1026, in the normal state, performs a large amplitude operation by the PWM operation. Accordingly, the load short-circuit detection circuit 108 included in the semiconductor integrated circuit IC according to the second embodiment is difficult to detect the short-circuit in the seek operation.

[Third Embodiment]

Figure 6:
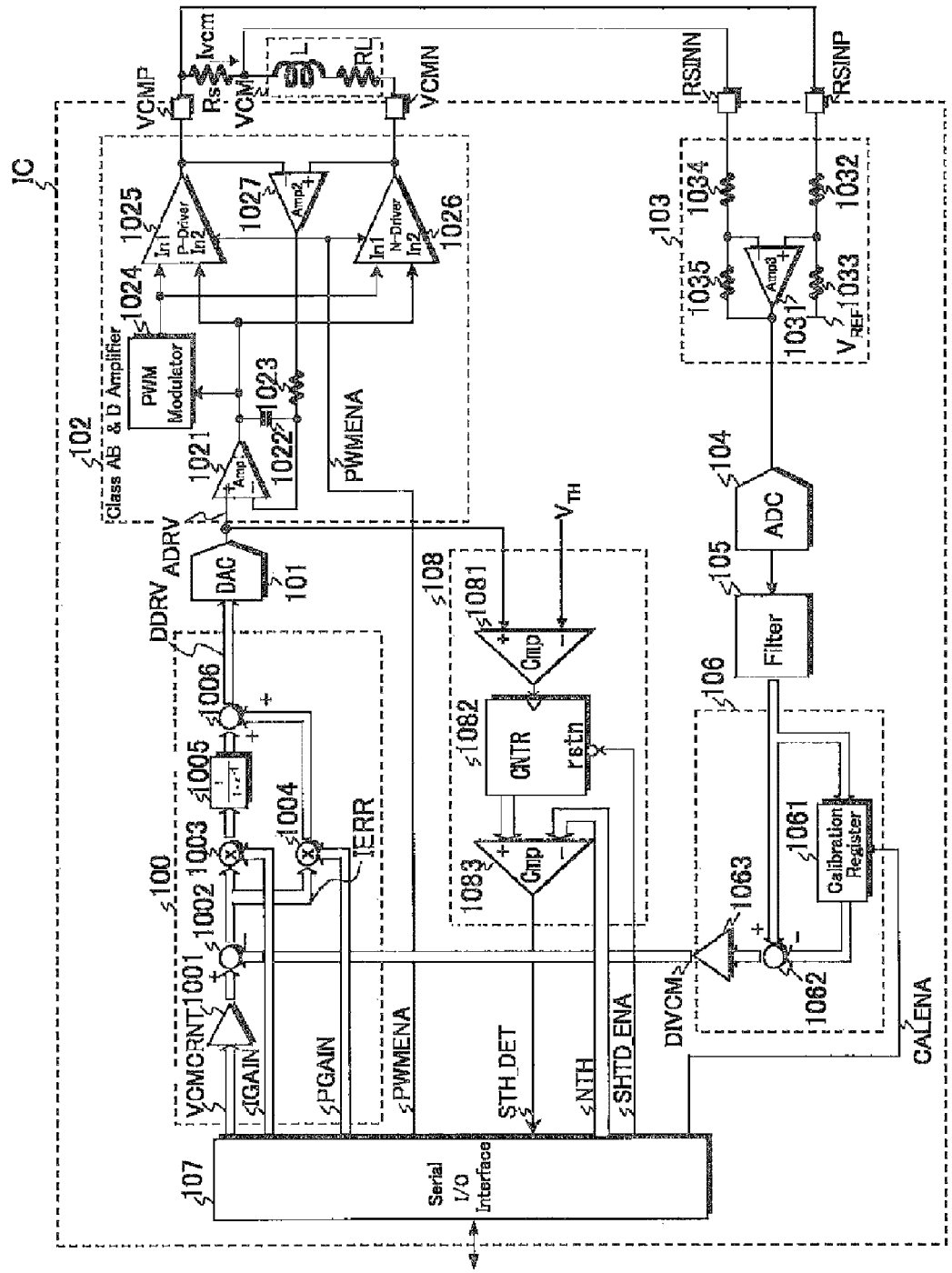
FIG. 6 is a view showing the configuration of a semiconductor integrated circuit IC, called a voice coil motor drive, for driving the voice coil motor (VCM) that moves a magnetic head of the hard disk drive unit (HDD), according to a third embodiment.

FIG. 6 is a view showing the configuration of a semiconductor integrated circuit IC, called a voice coil motor drive, for driving the voice coil motor (VCM) that moves a magnetic head of the hard disk drive unit (HDD), according to a fourth embodiment.

The semiconductor integrated circuit IC according to the third embodiment shown in FIG. 6 differs from the semiconductor integrated circuit IC according to the first embodiment shown in FIG. 1, in the following points.

That is, the load short-circuit detection circuit 108 of the semiconductor integrated circuit IC according to the third embodiment shown in FIG. 6 includes the first comparator 1081, the counter 1082, and the second comparator 1083.

The analog drive voltage command signal ADRV that is a conversion output signal of the digital-to-analog converter 101 and an analog voltage threshold value $V_{TH}$ are supplied to the non-inverting input terminal(+) and the inverting input terminal(−) of the first comparator 1081 constituted as an analog comparator, respectively. The comparison output signal of the first comparator 1081 constituted as an analog comparator is supplied to the count input terminal of the counter 1082, and the shut-down enable signal SHTD_ENA of a high level is supplied to the reset input terminal rstn of the counter 1082, at a substantially constant time interval.

The count output signal of the counter 1082 and the digital count threshold value NTH generated from the serial input/output interface 107 are supplied to the non-inverting input terminal(+) and the inverting input terminal(−) of the second comparator 1083 constituted as a digital comparator, respectively. Furthermore, from the output terminal of the second comparator 1083 constituted as a digital comparator, the shut-down detection signal SHT_DET as the load short-circuit detection signal is generated.

<<Operation of Load Short-Circuit Detection Circuit in Abnormal Operation State>>

Next, hereinafter, there will be described the operation of the load short-circuit detection circuit 108 included in the semiconductor integrated circuit IC according to the third embodiment shown in FIG. 6, in an abnormal operation state where the both ends of the voice coil motor (VCM) are in a short-circuit state.

Assume that the both ends of the voice coil motor (VCM) are in a short-circuit state in both cases of the seek operation of the magnetic head (when the PWM enable signal PWMENA is at a high level) and of the track follow operation (when the PWM enable signal PWMENA is at a low level). In this case, short-circuiting of the both ends of the voice coil motor (VCM) puts the voice coil motor driver into an extremely light load state, and thus the phase margin becomes insufficient in feedback-controlling the drive current of the coil of the voice coil motor and an abnormal oscillation is generated. Due to this abnormal oscillation, an abnormal oscillation waveform signal having a relatively large amplitude is generated at one of the circuit nodes in a feedback loop, from the output terminal of the digital subtractor 1002 of the digital difference generation/phase compensation control section 100 to one input terminal of the digital subtractor 1002.

In this state where an abnormal oscillation is generated, the analog drive voltage command signal ADRV that is a conversion output signal of the digital-to-analog converter 101 varies at an oscillating voltage of a large amplitude.

Accordingly, the analog voltage of the analog drive voltage command signal ADRV of the digital-to-analog converter 101 supplied to the non-inverting input terminal(+) of the first comparator 1081 of the load short-circuit detection circuit 108 has, at an abnormal oscillation cycle determined by an abnormal oscillation frequency, an instantaneous value larger than the analog voltage threshold value $V_{TH}$ supplied to the inverting input terminal(−) of the first comparator 1081 of the load short-circuit detection circuit 108. As a result, from the output terminal of the first comparator 1081 of the load short-circuit detection circuit 108, the comparison output pulse signal of a high level is generated at the above-described abnormal oscillation cycle. Accordingly, in response to the comparison output pulse signal of a high level generated at the abnormal oscillation cycle, the counter 1082 counts up and the count-up value of the counter 1082 increases from the zero value of a count initial value. Therefore, the count-up value of the counter 1082 supplied to the non-inverting input terminal(+) of the second comparator 1083 of the load short-circuit detection circuit 108 becomes a value larger than the digital count threshold value NTH supplied to the inverting input terminal(−) of the second comparator 1083. Accordingly, the shutdown detection signal SHT_DET as the load short-circuit detection signal generated from the output terminal of the second comparator 1083 of the load short-circuit detection circuit 108 becomes a high level. As a result, a controller such as a microcomputer externally coupled to the serial input/output interface 107 of the semiconductor integrated circuit IC shown in FIG. 6 recognizes, from the shutdown detection signal SHT_DET of a high level, that the both ends of the voice coil motor (VCM) are in a short-circuit state and in an abnormal operation state, and terminates the feedback control operation of the drive current Ivcm of the coil of the voice coil motor (VCM). For example, a controller such as a microcomputer sets the digital value of the command information of the digital drive current command value VCM-CRNT to a zero value in response to the shutdown detection signal SHT_DET of a high level. Thereby, the feedback control operation of the current value of the drive current Ivcm of the coil of the voice coil motor (VCM) is terminated.

Note that, as other operation termination method, in response to the shutdown detection signal SHT_DET of a high level of the load short-circuit detection circuit 108, the operation of the digital difference generation/phase compensation control section 100 can be stopped, or the operation of the digital-to-analog converter 101 can be stopped, or the operation of the driver output section 102 can be stopped.

With the above-described semiconductor integrated circuit IC according to the third embodiment shown in FIG. 6, in an abnormal operation state where the both ends of the voice coil motor (VCM) are in a short-circuit state, the feedback control operation of the current value of the drive current Ivcm of the coil of the voice coil motor (VCM) can be terminated. Accordingly, with the semiconductor integrated circuit IC according to the third embodiment shown in FIG. 6, smoke generation or firing of the voice coil motor driver for driving the voice coil motor (VCM) can be prevented in a state where both ends of the voice coil motor (VCM) are short-circuited.

[Fourth Embodiment]

Figure 7:
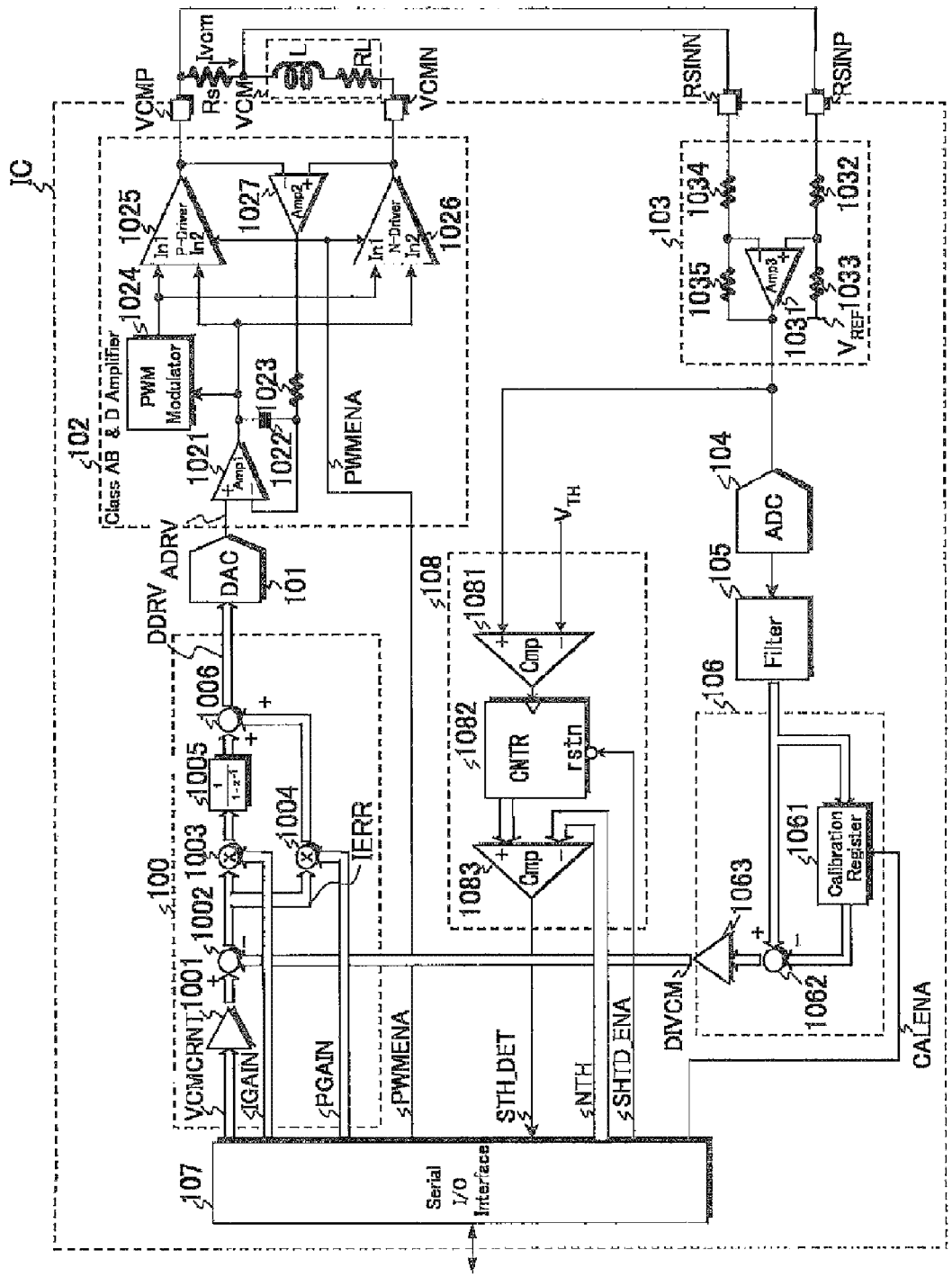
FIG. 7 is a view showing the configuration of a semiconductor integrated circuit IC, called a voice coil motor drive, for driving the voice coil motor (VCM) that moves a magnetic head of the hard disk drive unit (HDD), according to a fourth embodiment.

FIG. 7 is a view showing the configuration of a semiconductor integrated circuit IC, called a voice coil motor driver, for driving the voice coil motor (VCM) that moves a magnetic head of the hard disk drive unit (HDD), according to a fourth embodiment.

The semiconductor integrated circuit IC according to the fourth embodiment shown in FIG. 7 differs from the semiconductor integrated circuit IC according to the first embodiment shown in FIG. 1, in the following points.

That is, the load short-circuit detection circuit 108 of the semiconductor integrated circuit IC according to the fourth embodiment shown in FIG. 7 includes the first comparator 1081, the counter 1082, and the second comparator 1083.

The amplified output voltage as the voice coil motor drive current information from the drive current detection amplifier 103 and the analog voltage threshold value $V_{TH}$ are supplied to the non-inverting input terminal(+) and the inverting input terminal(−) of the first comparator 1081 constituted as an analog comparator, respectively. The comparison output signal of the first comparator 1081 constituted as an analog comparator is supplied to the count input terminal of the counter 1082, and the shut-down enable signal SHTD_ENA of a high level is supplied to the reset input terminal rstn of the counter 1082, at a substantially constant time interval.

The count output signal of the counter 1082 and the digital count threshold value NTH generated from the serial input/output interface 107 are supplied to the non-inverting input terminal(+) and the inverting input terminal(−) of the second comparator 1083 constituted as a digital comparator, respectively. Furthermore, from the output terminal of the second comparator 1083 constituted as a digital comparator, the shutdown detection signal SHT_DET as the load short-circuit detection signal is generated.

<<Operation of Load Short-Circuit Detection Circuit in Abnormal Operation State>>

Next, hereinafter, there will be described the operation of the load short-circuit detection circuit 108 included in the semiconductor integrated circuit IC according to the fourth embodiment shown in FIG. 7, in an abnormal operation state where the both ends of the voice coil motor (VCM) are in a short-circuit state.

Assume that the both ends of the voice coil motor (VCM) are in a short-circuit state in both cases of the seek operation of the magnetic head (when the PWM enable signal PWMENA is at a high level) and of the track follow operation (when the PWM enable signal PWMENA is at a low level). In this case, short-circuiting of the both ends of the voice coil motor (VCM) puts the voice coil motor driver into an extremely light load state, and thus the phase margin becomes insufficient in feedback-controlling the drive current of the coil of the voice coil motor and an abnormal oscillation is generated. Due to this abnormal oscillation, an abnormal oscillation waveform signal having a relatively large amplitude is generated at the one of circuit nodes in a feedback loop, from the output terminal of the digital subtractor 1002 of the digital difference generation/phase compensation control section 100 to one input terminal of the digital subtractor 1002.

In the state where this abnormal oscillation is generated, the amplified output voltage as the voice coil motor drive current information from the drive current detection amplifier 103 varies at an oscillating voltage of a large amplitude.

Accordingly, the analog amplification output voltage of the voice coil motor drive current information from the drive current detection amplifier 103 supplied to the non-inverting input terminal(+) of the first comparator 1081 of the load short-circuit detection circuit 108 has, at an abnormal oscillation cycle determined by an abnormal oscillation frequency, an instantaneous value larger than the analog voltage threshold value $V_{TH}$ supplied to the inverting input terminal(−) of the first comparator 1081 of the load short-circuit detection circuit 108. As a result, from the output terminal of the first comparator 1081 of the load short-circuit detection circuit 108, the comparison output pulse signal of a high level is generated at the above-described abnormal oscillation cycle. Accordingly, in response to the comparison output pulse signal of a high level generated at the abnormal oscillation cycle, the counter 1082 counts up and the count-up value of the counter 1082 increases from the zero value of a count initial value. Therefore, the count-up value of the counter 1082 supplied to the non-inverting input terminal(+) of the second comparator 1083 of the load short-circuit detection circuit 108 becomes a value larger than the digital count threshold value NTH supplied to the inverting input terminal(−) of the second comparator 1083. Accordingly, the shutdown detection signal SHT_DET as the load short-circuit detection signal generated from the output terminal of the second comparator 1083 of the load short-circuit detection circuit 108 becomes a high level. As a result, a controller such as a microcomputer externally coupled to the serial input/output interface 107 of the semiconductor integrated circuit IC shown in FIG. 7 recognizes, from the shutdown detection signal SHT_DET of a high level, that the both ends of the voice coil motor (VCM) are in a short-circuit state and in an abnormal operation state, and terminates the feedback control operation of the drive current Ivcm of the coil of the voice coil motor (VCM). For example, a controller such as a microcomputer sets the digital value of the command information of the digital drive current command value VCMCRNT to a zero value in response to the shutdown detection signal SHT_DET of a high level. Thereby, the feedback control operation of the current value of the drive current Ivcm of the coil of the voice coil motor (VCM) is terminated.

Note that, as other operation termination method, in response to the shutdown detection signal SHT_DET of a high level of the load short-circuit detection circuit 108, the operation of the digital difference generation/phase compensation control section 100 can be stopped, or the operation of the digital-to-analog converter 101 can be stopped, or the operation of the driver output section 102 can be stopped.

With the above-described semiconductor integrated circuit IC according to the fourth embodiment shown in FIG. 7, in an abnormal operation state where the both ends of the voice coil motor (VCM) are in a short-circuit state, the feedback control operation of the current value of the drive current Ivcm of the coil of the voice coil motor (VCM) can be terminated. Accordingly, with the semiconductor integrated circuit IC according to the fourth embodiment shown in FIG. 7, smoke generation or firing of the voice coil motor driver for driving the voice coil motor (VCM) can be prevented in a state where both ends of the voice coil motor (VCM) are short-circuited.

[Fifth Embodiment]

Figure 8:
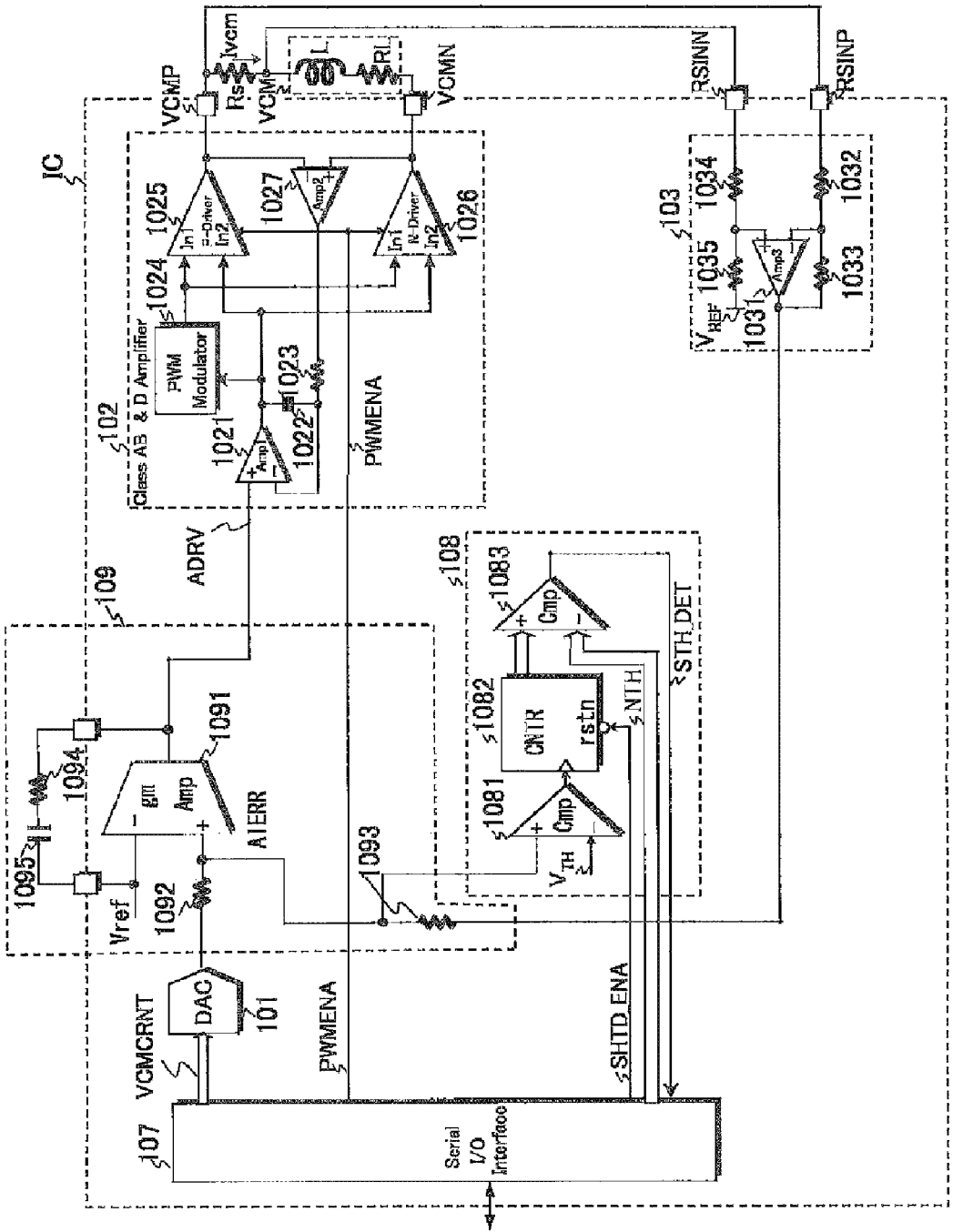
FIG. 8 is a view showing the configuration of a semiconductor integrated circuit IC, called a voice coil motor drive, for driving the voice coil motor (VCM) that moves a magnetic head of the hard disk drive unit (HDD), according to a fifth embodiment.

FIG. 8 is a view showing the configuration of a semiconductor integrated circuit IC, called a voice coil motor driver, for driving the voice coil motor (VCM) that moves a magnetic head of the hard disk drive unit (HDD), according to a fifth embodiment.

The semiconductor integrated circuit IC according to the fifth embodiment shown in FIG. 8 differs from the semiconductor integrated circuit IC according to the fourth embodiment shown in FIG. 7, in the following points.

That is, in the semiconductor integrated circuit IC according to the fifth embodiment shown in FIG. 8, the digital difference generation/phase compensation control section 100 of the semiconductor integrated circuit IC according to the fourth embodiment shown in FIG. 7 is replaced with an analog difference generation/phase compensation control section 109. From this reason, the digital-to-analog converter 101 is coupled between the serial input/output interface 107 and the analog difference generation/phase compensation control section 109, and the command information of the digital drive current command value VCMCRNT supplied to the serial input/output interface 107 from a controller is supplied to the digital-to-analog converter 101. The analog drive current command value of the output of the digital-to-analog converter 101 is supplied to one end of a resistor 1092 of the analog difference generation/phase compensation control section 109.

Furthermore, the drive current detection amplifier 103 of the semiconductor integrated circuit IC according to the fifth embodiment shown in FIG. 8 has a circuit connection different from the drive current detection amplifier 103 of the semiconductor integrated circuit IC according to the fourth embodiment shown in FIG. 7.

That is, in the drive current detection amplifier 103 shown in FIG. 8, one current detection terminal RSINP is coupled to the inverting input terminal(−) of the differential amplifier 1031 of the drive current detection amplifier 103 via the resistor 1032, and this inverting input terminal(−) is coupled to the output terminal of the differential amplifier 1031 via the resistor 1033. The other current detection terminal RSINN is coupled to the non-inverting input terminal(+) of the differential amplifier 1031 of the drive current detection amplifier 103 via the resistor 1034, and the reference voltage $V_{REF}$ is supplied to this inverting input terminal(+) via the resistor 1035. Accordingly, the drive current detection amplifier 103 shown in FIG. 8 generates an inverted amplified voltage in response to the coil drive current Ivcm flowing through the current sensing resistor Rs coupled in series to the voice coil motor (VCM). The information about a drive current inverted amplified voltage of the voice coil motor (VCM) of the drive current detection amplifier 103 shown in FIG. 8 is supplied to one end of a resistor 1093 of the analog difference generation/phase compensation control section 109.

Accordingly, the resistor 1092 and the resistor 1093 of the analog difference generation/phase compensation control section 109 of the semiconductor integrated circuit IC according to the fifth embodiment shown in FIG. 8 executes an analog summation of the analog drive current command value of the output of the digital-to-analog converter 101 and the drive current inverted amplified voltage of the voice coil motor (VCM) of the drive current detection amplifier 103. That is, the resistors 1092 and 1093 executes analog subtraction AIERR of the analog drive current command value of the output of the digital-to-analog converter 101 and a drive current non-inverting amplified voltage of the voice coil motor (VCM) of the drive current detection amplifier 103.

In the analog difference generation/phase compensation control section 109 of the semiconductor integrated circuit IC according to the fifth embodiment shown in FIG. 8, other end of the resistor 1092 and other end of the resistor 1093 are coupled to a non-inverting input terminal(+) of a conductance amplifier 1091, and the reference voltage $V_{ref}$ is supplied to an inverting input terminal(−) of the conductance amplifier 1091. Furthermore, between an output terminal of the conductance amplifier 1091 and the reference voltage $V_{ref}$ an integral resistor 1094 and an integral capacitance 1095 constituted by an external component of the semiconductor integrated circuit IC are coupled in series.

As a result, the conductance amplifier 1091 generates an output current in response to the analog subtraction voltage AIERR performed by two resistors 1092 and 1093, and therefore this output current flows through the integral resistor 1094 and integral capacitor 1095 coupled in series, and an analog subtraction integrated voltage is generated from the output terminal of the conductance amplifier 1091. Accordingly, the analog difference generation/phase compensation control section 109 of the semiconductor integrated circuit IC according to the fifth embodiment shown in FIG. 8 executes analog signal processing equivalent to the digital signal processing of the digital difference generation/phase compensation control section 100 of the semiconductor integrated circuit IC according to the fourth embodiment shown in FIG. 7.

In contrast, the load short-circuit detection circuit 108 of the semiconductor integrated circuit IC according to the fifth embodiment shown in FIG. 8 includes the first comparator 1081, the counter 1082, and the second comparator 1083.

To the non-inverting input terminal(+) and the inverting input terminal(−) of the first comparator 1081 constituted as an analog comparator, the analog subtraction voltage AIERR of two resistors 1092 and 1093 of the analog difference generation/phase compensation control section 109 and the analog voltage threshold value $V_{TH}$ are supplied, respectively. The comparison output signal of the first comparator 1081 constituted as an analog comparator is supplied to the count input terminal of the counter 1082, and the shut-down enable signal SHTD_ENA of a high level is supplied to the reset input terminal rstn of the counter 1082 at a substantially constant time interval.

To a non-inverting input terminal(+) and an inverting input terminal(−) of the second comparator 1083 constituted as a digital comparator, a count output signal of the counter 1082 and a digital count threshold value NTH generated from the serial input/output interface 107 are supplied, respectively. Furthermore, from the output terminal of the second comparator 1083 constituted as a digital comparator, the shut-down detection signal SHT_DET as the load short-circuit detection signal is generated.

<<Operation of Load Short-Circuit Detection Circuit in Abnormal Operation State>>

Next, hereinafter, there will be described the operation of the load short-circuit detection circuit 108 included in the semiconductor integrated circuit IC according to the fifth embodiment shown in FIG. 8, in an abnormal operation state where the both ends of the voice coil motor (VCM) are in a short-circuit state.

Assume that the both ends of the voice coil motor (VCM) are in a short-circuit state in both cases of the seek operation of the magnetic head (when the PWM enable signal PWMENA is at a high level) and the track follow operation (when the PWM enable signal PWMENA is at a low level). In this case, short-circuiting of the both ends of the voice coil motor (VCM) puts the voice coil motor driver into an extremely light load state, and thus the phase margin becomes insufficient in feedback-controlling the drive current of the coil of the voice coil motor and an abnormal oscillation is generated. Due to this abnormal oscillation, an abnormal oscillation waveform signal having a relatively large amplitude is generated at the one of circuit nodes in a feedback loop from the output terminal of the conductance amplifier 1091 of the analog difference generation/phase compensation control section 109 to the non-inverting input terminal(+) of the conductance amplifier 1091.

As described above, in an abnormal operation state where the both ends of the voice coil motor (VCM) are in a short-circuit state, the analog subtraction voltage AIERR of two resistors 1092 and 1093 of the analog difference generation/phase compensation control section 109 does not become substantially zero. Accordingly, the analog subtraction voltage AIERR of the analog difference generation/phase compensation control section 109 supplied to the non-inverting input terminal(+) of the first comparator 1081 of the load short-circuit detection circuit 108 has, at an abnormal oscillation cycle determined by an abnormal oscillation frequency, an instantaneous value larger than the analog voltage threshold value $V_{TH}$ supplied to the inverting input terminal(−) of the first comparator 1081 of the load short-circuit detection circuit 108. As a result, from the output terminal of the first comparator 1081 of the load short-circuit detection circuit 108, the comparison output pulse signal of a high level is generated at the above-described abnormal oscillation cycle. Accordingly, in response to the comparison output pulse signal of a high level generated at the abnormal oscillation cycle, the counter 1082 counts up and the count-up value of the counter 1082 increases from the zero value of a count initial value. As a result, the count-up value of the counter 1082 supplied to the non-inverting input terminal(+) of the second comparator 1083 of the load short-circuit detection circuit 108 becomes a value larger than the digital count threshold value NTH supplied to the inverting input terminal(−) of the second comparator 1083. Accordingly, the shutdown detection signal SHT_DET as the load short-circuit detection signal generated from the output terminal of the second comparator 1083 of the load short-circuit detection circuit 108 becomes a high level. As a result, a controller, such as a microcomputer, externally coupled to the serial input/output interface 107 of the semiconductor integrated circuit IC shown in FIG. 8 recognizes, from the shutdown detection signal SHT_DET of a high level, that the both ends of the voice coil motor (VCM) are in a short-circuit state and in an abnormal operation state, and terminates the feedback control operation of the drive current Ivcm of the coil of the voice coil motor (VCM). For example, a controller, such as a microcomputer, sets the digital value of the command information of the digital drive current command value VCMCRNT to a zero value in response to the shutdown detection signal SHT_DET of a high level.

Thereby, the feedback control operation of the current value of the drive current Ivcm of the coil of the voice coil motor (VCM) is terminated.

Note that, as other operation termination method, the operation of the digital-to-analog converter 101 can be stopped or the operation of the driver output section 102 can be stopped in response to the shutdown detection signal SHT_DET of a high level of the load short-circuit detection circuit 108.

With the above-described semiconductor integrated circuit IC according to the fifth embodiment shown in FIG. 8, in an abnormal operation state where the both ends of the voice coil motor (VCM) are in a short-circuit state, the feedback control operation of the current value of the drive current Ivcm of the coil of the voice coil motor (VCM) can be terminated. Accordingly, with the semiconductor integrated circuit IC according to the fifth embodiment shown in FIG. 8, smoke generation or firing of the voice coil motor driver for driving the voice coil motor (VCM) can be prevented in the state where both ends of the voice coil motor (VCM) are short-circuited.

As described above, although the invention made by the present inventor has been described specifically on the basis of the various embodiments, it is needless to say that the present invention is not limited thereto and various modifications are possible without departing from the gist of the invention.

For example, in the semiconductor integrated circuit IC according to each of the second embodiment of FIG. 5, the third embodiment of FIG. 6, and the fourth embodiment of FIG. 7, the digital difference generation/phase compensation control section 100 can be replaced with the analog difference generation/phase compensation control section 109, as with semiconductor integrated circuit IC according to the fifth embodiment shown in FIG. 8. In such a case, the circuit connection of the drive current detection amplifier 103 of the semiconductor integrated circuit IC according to each of the second embodiment of FIG. 5, the third embodiment of FIG. 6, and the fourth embodiment of FIG. 7 is changed to the circuit connection of the drive current detection amplifier 103 of semiconductor integrated circuit IC according to the fifth embodiment shown in FIG. 8.

Furthermore, the motor drive controller according to the present invention is not limited only to the voice coil motor driver for driving the voice coil motor (VCM) used in the hard disk drive unit (HDD). For example, the present invention can be applied also to a motor driver for driving an arm of an industrial robot for performing ultra-precision machining works.

What is claimed is:

1. A motor drive controller, comprising:
a difference control section; a driver output section; a drive current detection amplifier; and a load short-circuit detection circuit,
wherein a motor and sensing resistor coupled in series can be coupled to an output terminal of the driver output section,
wherein the difference control section generates a drive voltage command signal in response to a drive current command value and a drive current detection signal, and supplies the same to an input terminal of the driver output section,
wherein the driver output section generates a drive output signal for driving the motor and sensing resistor coupled in series, in response to the drive voltage command signal generated from the difference control section,
wherein the drive current detection amplifier generates the drive current detection signal fed back to the difference control section, in response to a drive current flowing through the sensing resistor,
wherein an input terminal of the load short-circuit detection circuit is coupled to one of circuit nodes in a feedback loop including the difference control section, the driver output section, the motor and sensing resistor coupled in series, and the drive current detection amplifier, and
wherein the load short-circuit detection circuit detects an abnormal oscillation waveform signal generated at the one of circuit nodes caused by a short-circuit state between both ends of the motor.

2. The motor drive controller according to claim 1,
wherein the load short-circuit detection circuit includes a first comparator, to one input terminal of which the abnormal oscillation waveform signal generated at the one of circuit nodes is supplied and to other input terminal of which first threshold value information is supplied, and
wherein a first comparison output signal obtained by detecting the abnormal oscillation waveform signal is generated from an output terminal of the first comparator in response to the abnormal oscillation waveform signal becoming a value larger than the first threshold value information.

3. The motor drive controller according to claim 2,
wherein the load short-circuit detection circuit further includes a counter, to a count input terminal of which the first comparison output signal generated from the output terminal of the first comparator is supplied, and
wherein the counter generates a count-up value by counting up in response to a pulse signal of the first comparison output signal that is generated from the output terminal of the first comparator at a cycle of the abnormal oscillation waveform signal.

4. The motor drive controller according to claim 3,
wherein the load short-circuit detection circuit includes a second comparator, to one input terminal of which the count-up value generated by the counter is supplied and to other input terminal of which second threshold value information is supplied,
wherein a second comparison output signal, which is obtained by detecting the abnormal oscillation waveform signal, is generated from an output terminal of the second comparator in response to the count-up value becoming a value larger than the second threshold value information, and
wherein the load short-circuit detection circuit outputs, as a load short-circuit detection signal, the second comparison output signal generated from the output terminal of the second comparator.

5. The motor drive controller according to claim 4, further comprising:
an external interface; a digital-to-analog converter; and an analog-to-digital converter,
wherein the external interface supplies the drive current command value which is digital information supplied from outside, to a command input terminal of the difference control section,
wherein the digital-to-analog converter generates an analog drive voltage command signal in response to the drive voltage command signal that is a digital signal supplied from the difference control section, and supplies the analog drive voltage command signal to the input terminal of the driver output section,
wherein the drive current detection amplifier generates a drive current analog amplification signal in response to the drive current flowing through the sensing resistor, and
wherein the analog-to-digital converter generates the drive current detection signal that is a digital detection signal fed back to the feedback terminal of the difference control section, in response to the drive current analog amplification signal generated from the drive current detection amplifier.

6. The motor drive controller according to claim 5,
wherein the driver output section includes a pre-driver, a first driver output amplifier, and a second driver output amplifier,
wherein the analog drive voltage command signal generated from the digital-to-analog converter is supplied to an input terminal of the pre-driver,
wherein an output terminal of the pre-driver is coupled to an input terminal of the first driver output amplifier and an input terminal of the second driver output amplifier, and an output terminal of the first driver output amplifier and an output terminal of the second driver output amplifier can be coupled to one end and other end of the motor and sensing resistor coupled in series, respectively,
wherein in a pulse drive operation mode, the first driver output amplifier and the second driver output amplifier generate a drive pulse with a pulse width proportional to a voltage level of the output terminal of the pre-driver, and
wherein in a linear drive mode different from the pulse drive operation mode, the first driver output amplifier and the second driver output amplifier generate an amplified output signal proportional to a voltage level of the output terminal of the pre-driver.

7. The motor drive controller according to claim 6,
wherein in the pulse drive operation mode, a predetermined bias voltage is supplied to each transistor of the first driver output amplifier and the second driver output amplifier so that the first driver output amplifier and the second driver output amplifier execute a class-D amplification operation, and
wherein in the linear drive mode, a bias voltage larger than the predetermined bias voltage is supplied to the each transistor of the first driver output amplifier and the second driver output amplifier so that the first driver output amplifier and the second driver output amplifier perform a class-AB amplification operation.

8. The motor drive controller according to claim 7,
wherein the digital-to-analog converter is a $\Sigma\Delta$ digital-to-analog converter.

9. The motor drive controller according to claim 8,
wherein the analog-to-digital converter is an oversampling $\Sigma\Delta$ analog-to-digital converter.

10. The motor drive controller according to claim 9, further comprising:
a decimation filter coupled between an output terminal of the oversampling $\Sigma\Delta$ analog-to-digital converter and the feedback terminal of the difference control section,
wherein the decimation filter executes decimation processing of a conversion output signal of the oversampling $\Sigma\Delta$ analog-to-digital converter and low pass filtering processing for suppressing quantization noises in a high frequency region of the oversampling $\Sigma\Delta$ analog-to-digital converter.

11. The motor drive controller according to claim 10, further comprising:
an offset calibration section coupled between an output terminal of the decimation filter and the feedback terminal of the difference control section,
wherein the offset calibration section includes a calibration register and an offset digital subtractor,
wherein in a state where the drive current of the sensing resistor is set to substantially zero, error information about the drive current detection amplifiers, the analog-to-digital converter, and the decimation filter is stored into the calibration register, and
wherein in a normal operation, the offset digital subtractor generates the drive current detection signal that is the digital detection signal fed back to the feedback terminal of the difference control section, by subtracting the error information stored in the calibration register from the output signal of the decimation filter.

12. The motor drive controller according to claim 11,
wherein the motor is a voice coil motor that moves a magnetic head of a hard disk drive unit.

13. The motor drive controller according to claim 12,
wherein the difference control section includes a digital subtractor that executes digital subtraction of the drive current command value supplied to the command input terminal of the difference control section and the drive current detection signal fed back to the feedback terminal of the difference control section, and wherein the drive voltage command signal that is the digital signal supplied to the digital-to-analog converter, is generated from an output terminal of the digital subtractor.

14. The motor drive controller according to claim 13, wherein the one of circuit nodes, to which the one input terminal of the first comparator of the load short-circuit detection circuit is coupled, is any of output terminals of the digital subtractor of the difference control section, the first driver output amplifier, the second driver output amplifier, the digital-to-analog converter, and the drive current detection amplifier.

15. The motor drive controller according to claim 14, wherein the difference control section, the digital-to-analog converter, the driver output section, the drive current detection amplifiers, the analog-to-digital converter, the decimation filter, and the offset calibration section are integrated into a semiconductor chip of a semiconductor integrated circuit.

16. A method of operating a motor drive controller comprising:
a difference control section, a driver output section, a drive current detection amplifier, and a load short-circuit detection circuit,
wherein a motor and sensing resistor coupled in series can be coupled to an output terminal of the driver output section,
wherein the difference control section generates a drive voltage command signal in response to a drive current command value and a drive current detection signal, and supplies the same to an input terminal of the driver output section,
wherein the driver output section generates a drive output signal for driving the motor and sensing resistor coupled in series, in response to the drive voltage command signal generated from the difference control section,
wherein the drive current detection amplifier generates the drive current detection signal fed back to the difference control section, in response to a drive current flowing through the sensing resistor,
wherein an input terminal of the load short-circuit detection circuit is coupled to one of circuit nodes in a feedback loop including the difference control section, the driver output section, the motor and sensing resistor coupled in series, and the drive current detection amplifier, and
wherein the load short-circuit detection circuit detects an abnormal oscillation waveform signal generated at the one of circuit nodes caused by a short-circuit state between both ends of the motor.

17. The method for operating a motor drive controller according to claim 16,
wherein the load short-circuit detection circuit includes a first comparator, to one input terminal of which the abnormal oscillation waveform signal generated at the one of circuit nodes is supplied and to other input terminal of which first threshold value information is supplied, and wherein a first comparison output signal obtained by detecting the abnormal oscillation waveform signal is generated from an output terminal of the first comparator in response to the abnormal oscillation waveform signal becoming a value larger than the first threshold value information.

18. The method for operating a motor drive controller according to claim 17,
wherein the load short-circuit detection circuit further includes a counter, to a count input terminal of which the first comparison output signal generated from the output terminal of the first comparator is supplied, and
wherein the counter generates a count-up value by counting up in response to a pulse signal of the first comparison output signal that is generated from the output terminal of the first comparator at a cycle of the abnormal oscillation waveform signal.

19. The method for operating a motor drive controller according to claim 18,
wherein the load short-circuit detection circuit includes a second comparator, to one input terminal of which the count-up value generated by the counter is supplied and to other input terminal of which second threshold value information is supplied,
wherein a second comparison output signal obtained by detecting the abnormal oscillation waveform signal, is generated from an output terminal of the second comparator in response to the count-up value becoming a value larger than the second threshold value information, and
wherein the load short-circuit detection circuit outputs, as a load short-circuit detection signal, the second comparison output signal generated from the output terminal of the second comparator.

20. The method for operating a motor drive controller according to claim 19, the motor drive controller further comprising:
an external interface; a digital-to-analog converter; and an analog-to-digital converter,
wherein the external interface supplies the drive current command value that is digital information supplied from outside, to a command input terminal of the difference control section,
wherein the digital-to-analog converter generates an analog drive voltage command signal in response to the drive voltage command signal that is a digital signal supplied from the difference control section, and supplies the analog drive voltage command signal to the input terminal of the driver output section,
wherein the drive current detection amplifier generates a drive current analog amplification signal in response to the drive current flowing through the sensing resistor, and
wherein the analog-to-digital converter generates the drive current detection signal that is a digital detection signal fed back to the feedback terminal of the difference control section, in response to the drive current analog amplification signal generated from the drive current detection amplifier.

* * * * *

UNITED STATES PATENT AND TRADEMARK OFFICE
CERTIFICATE OF CORRECTION

| | |
|---|---|
| PATENT NO. | : 9,178,462 B2 |
| APPLICATION NO. | : 14/087237 |
| DATED | : November 3, 2015 |
| INVENTOR(S) | : Minoru Kurosawa et al. |

It is certified that error appears in the above-identified patent and that said Letters Patent is hereby corrected as shown below:

IN THE DRAWINGS

Sheet 2 of 8, Fig. 2A: Delete "$f_p=R_L/2\pi L$)" and insert --fp=R$_L$/(2πL)--

Sheet 2 of 8, Fig. 2B: Delete "$fz=f_p$" and insert --fz=fp--

Sheet 2 of 8, Fig. 2D: Delete "$f_0$" and insert --f0--

Sheet 2 of 8, Fig. 2D: Delete "$fz=f_p$" and insert --fz=fp--

Sheet 3 of 8, Fig. 3D: Delete "$f_0'$" and insert --f0'--

Sheet 3 of 8, Fig. 3D: Delete "$f_0' \gg f_0$" and insert --f0'>>f0--

Sheet 8 of 8, Fig 8: Delete "Vref" and insert --V$_{ref}$--

Signed and Sealed this
Twenty-ninth Day of March, 2016

Michelle K. Lee
*Director of the United States Patent and Trademark Office*